United States Patent [19]
Blood et al.

[11] Patent Number: 5,651,057
[45] Date of Patent: Jul. 22, 1997

[54] METHOD OF COMMUNICATING DATA FROM REMOTE DEVICES TO A CENTRAL COMPUTER VIA A TELECOMMUNICATIONS LINK

[75] Inventors: Dennis C. Blood, North St. Paul, Minn.; Daryl E. Ingalsbe, Blair, Nebr.; Joseph T. Tousignant, Cottage Grove; Joseph M. Walsh, West St. Paul, both of Minn.

[73] Assignee: Independent Technologies, Inc., New London, Minn.

[21] Appl. No.: 837,269

[22] Filed: Feb. 18, 1992

[51] Int. Cl.$^6$ .................................................. H04M 11/00
[52] U.S. Cl. .......................... 379/106.07; 379/106.08; 379/93.01; 379/102.01; 379/123
[58] Field of Search ................................. 379/106, 107, 379/102, 104, 105, 97, 146, 147, 148, 143, 155; 340/870.02

[56] References Cited

U.S. PATENT DOCUMENTS

| | | | |
|---|---|---|---|
| 3,922,492 | 11/1975 | Lumsden | 179/2 |
| 4,122,308 | 10/1978 | Weinberger et al. | 179/7.1 |
| 4,208,549 | 6/1980 | Polillo et al. | 179/6.3 |
| 4,707,852 | 11/1987 | Jahr et al. | 379/107 |
| 4,720,851 | 1/1988 | Smith | 340/870.02 |
| 4,736,444 | 4/1988 | Dhein | 379/147 |
| 4,766,548 | 8/1988 | Cedrone et al. | 364/479 |
| 4,777,647 | 10/1988 | Smith et al. | 379/151 |
| 4,811,011 | 3/1989 | Sollinger | 340/870 |
| 4,811,389 | 3/1989 | Balch | 379/107 |
| 4,833,618 | 5/1989 | Verma et al. | 340/870.02 |
| 4,850,010 | 7/1989 | Stanbury et al. | 379/107 |
| 4,860,346 | 8/1989 | Mellon | 379/155 |
| 4,862,493 | 8/1989 | Venkataraman et al. | 340/870.02 |
| 4,866,761 | 9/1989 | Thornborough et al. | 379/107 |
| 4,893,332 | 1/1990 | Brown | 379/107 |
| 4,955,052 | 9/1990 | Hussain | 379/106 |
| 4,958,371 | 9/1990 | Damoci et al. | 379/107 |
| 5,010,568 | 4/1991 | Merriam et al. | 379/106 |
| 5,020,097 | 5/1991 | Tanaka et al. | 379/102 |

*Primary Examiner*—Curtis Kuntz
*Assistant Examiner*—Stella L. Woo
*Attorney, Agent, or Firm*—Joel Skinner

[57] ABSTRACT

A method for communicating data from one or more remote computerized coin telephone auditing devices to a central computer via a telephone line, which comprises the steps of receiving input data signals at a remote computerized auditing device, decoding the input data signals into digital data, and processing and storing the data signals. The digital data are then retrieved. The processing, storing and retrieving steps are accomplished by reading and writing the digital data from volatile memory to a non-volatile memory, and from non-volatile memory to volatile memory. The digital data is coded into corresponding output data signals, and are transmitted to the central computer via the telephone line. The receiving and transmitting steps are accomplished by the exchange of a predetermined sequence of data signals, whereby the remote computerized device and the central computer correctly identify each data signal. Finally, the method periodically disrupts the method for a predetermined time period, whereby power consumption by the remote computerized device is temporarily disrupted.

12 Claims, 42 Drawing Sheets

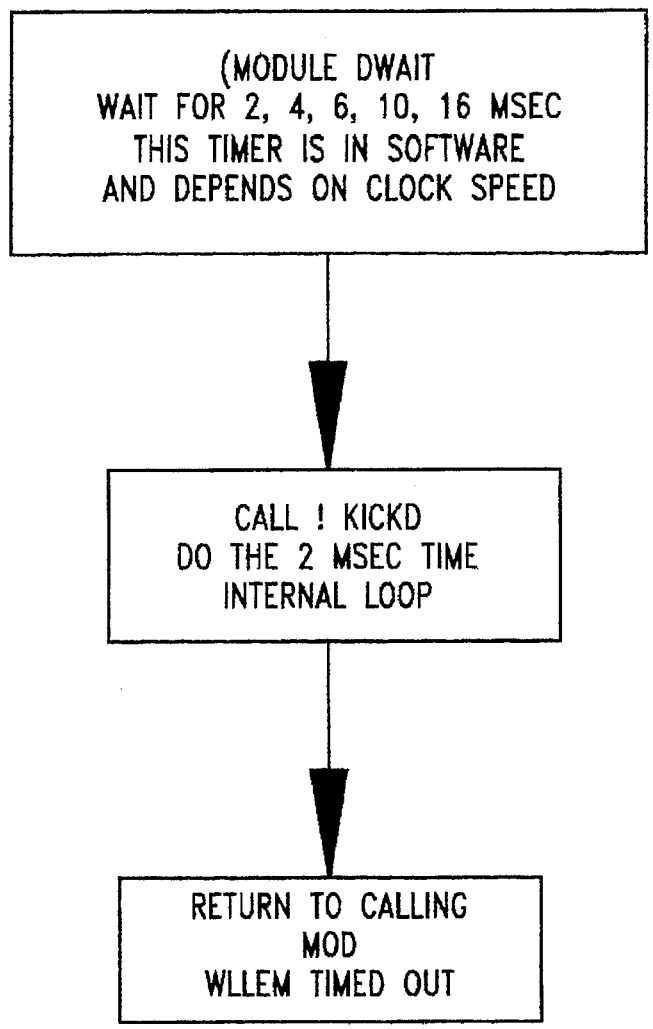
FIG. 17

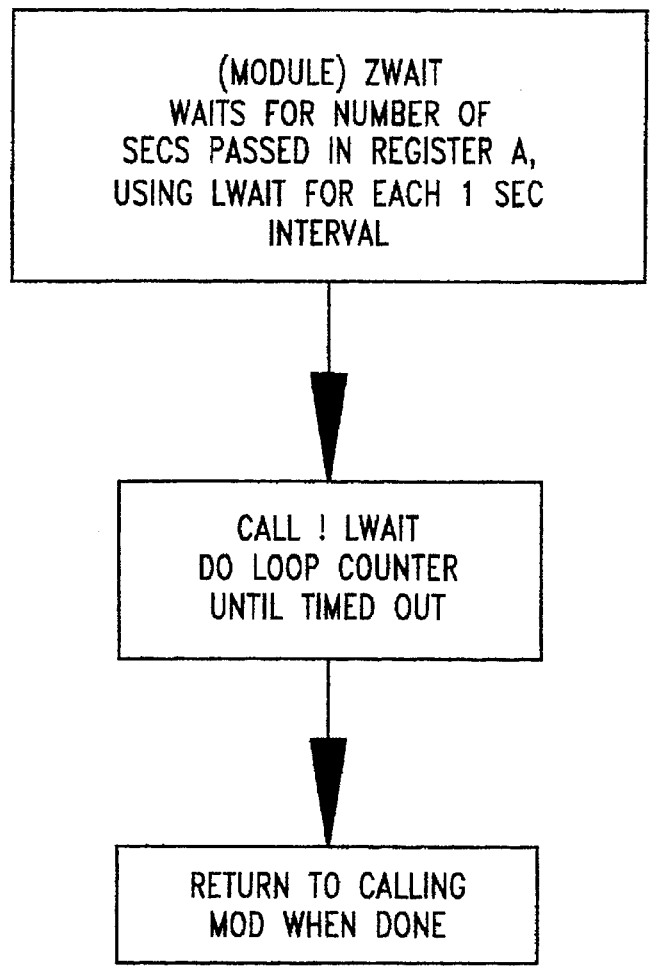
FIG. 18

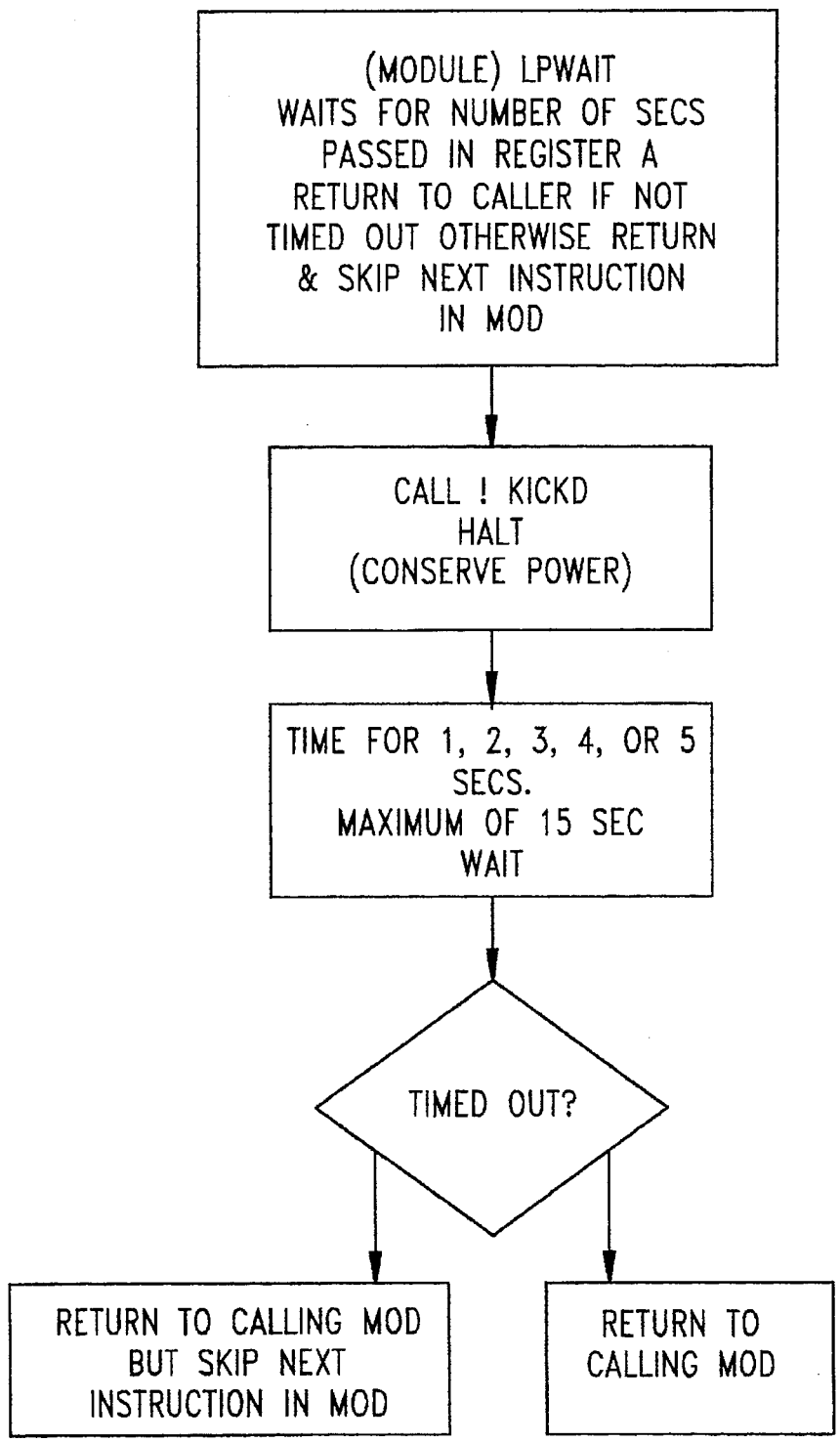
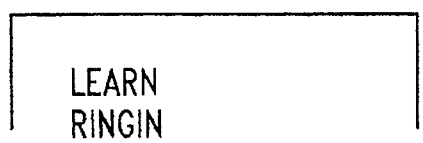
FIG. 19

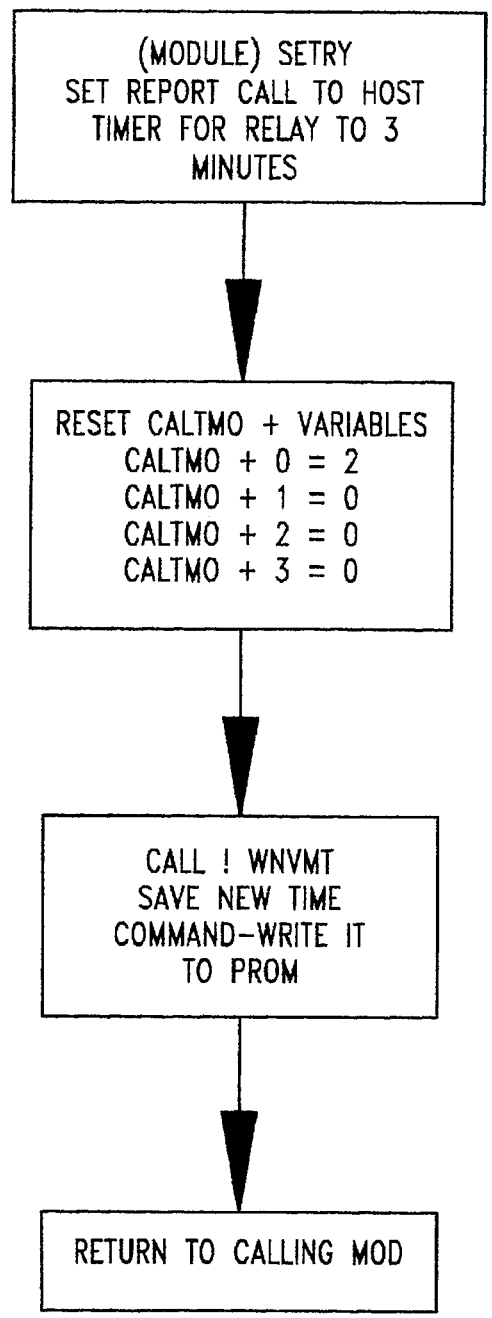
FIG. 20

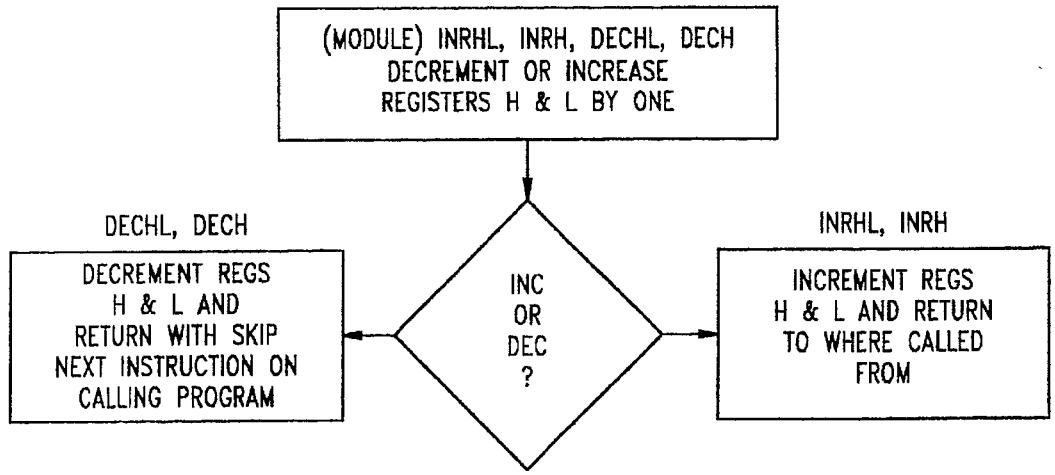
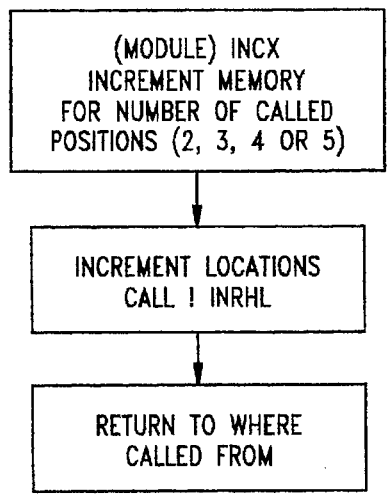
FIG. 24

DECB CALLED FROM:

COLRET

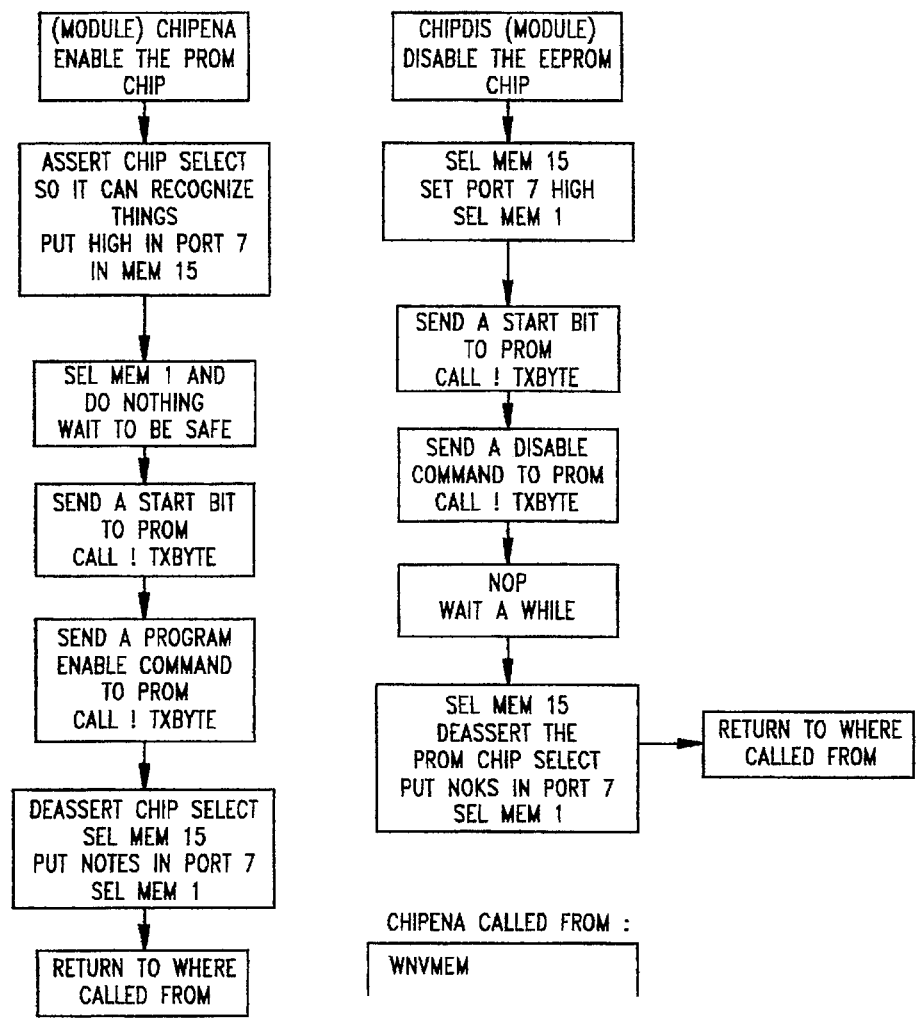
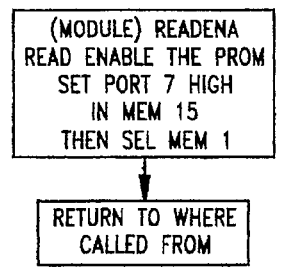
FIG. 38

METHOD OF COMMUNICATING DATA FROM REMOTE DEVICES TO A CENTRAL COMPUTER VIA A TELECOMMUNICATIONS LINK

SPECIFICATION

BACKGROUND OF THE INVENTION

This invention relates to monitoring and controlling systems and particularly to a monitoring system for remote devices which are communicatively connected via telephone lines and or telcom networks. The system operates from a central location to collect, store and manipulate information from remotely located devices such as gas, electric and water meters, vending machines, automatic teller machines (ATM's), casino gaming devices, alarm and security systems and telecommunications systems. In particular, the system is useful to monitor, control and communicate with a plurality of pay (coin) telephones from a central location.

In the past, various systems and methods have been used and proposed to monitor and/or control remote separate devices or units. However, these systems and methods have significant shortcomings and limitations.

Despite the need for a system and method in the art which are easy to install, secure from fraud, useable to monitor and control a plurality of remotely located devices from a central location, and which overcome the limitations and problems of the prior art, none insofar as is known have been proposed or developed.

Accordingly, it is the object of the present invention to provide a system which is useful for monitoring and controlling a plurality of remotely located devices from a central facility and for analyzing data from such devices. Another object is to provide a system which is usable by entities having a large number of remotely located subscribers or customers such as public utilities, or security systems. Further objects of this invention are to provide methods for collecting data at the remotely located devices, for communicating data from the remotely located devices to the central system, and for communicating control signals from the central system to the remotely located devices. Still further objects of this invention are to provide hardware systems for the central facility and for the remote devices to accomplish the above-referenced processes. Finally, it is a particular object of this invention to provide hardware for the remote devices which may be powered solely via normal telephone line current.

SUMMARY OF THE INVENTION

The present invention provides a method for communicating data from one or more remote computerized coin telephone auditing devices to a central computer via a telephone line. Input data signals are first received at a remote computerized auditing device. The input data signals are decoded into digital data, then processed and stored. The digital data is then retrieved. The processing, storing and retrieving steps are accomplished by reading and writing the digital data from volatile memory means to a non-volatile memory means, and from non-volatile memory means to volatile memory means. The digital data is coded into corresponding output data signals, and are then transmitted to the central computer via the telephone line. The receiving and transmitting steps are accomplished by the exchange of a predetermined sequence of data signals, whereby the remote computerized device and the central computer correctly identify each data signal. Finally, the method involves the step of periodically disrupting the method for a predetermined time period, whereby power consumption by the remote computerized device is temporarily disrupted.

These and other benefits of this invention will become clear from the following description by reference to the drawings.

BRIEF DESCRIPTION OF THE DRAWINGS

FIG. 17 is a flow diagram of another wait routine of the remote unit software;

FIG. 18 is a flow diagram of yet another wait routine of the remote unit software;

FIG. 19 is a flow diagram of a wait for 1, 2, 3, 4 or 5 seconds routine of the remote unit software;

FIG. 20 is a flow diagram of a routine to retry a report of the remote unit software;

FIG. 24 is a flow diagram showing an address incrementing routine of the remote unit software;

FIG. 38 is a flow diagram showing chip enable and disable routines of the remote unit software;

DESCRIPTION OF THE PREFERRED EMBODIMENT

1. System Overview

Figure 1:
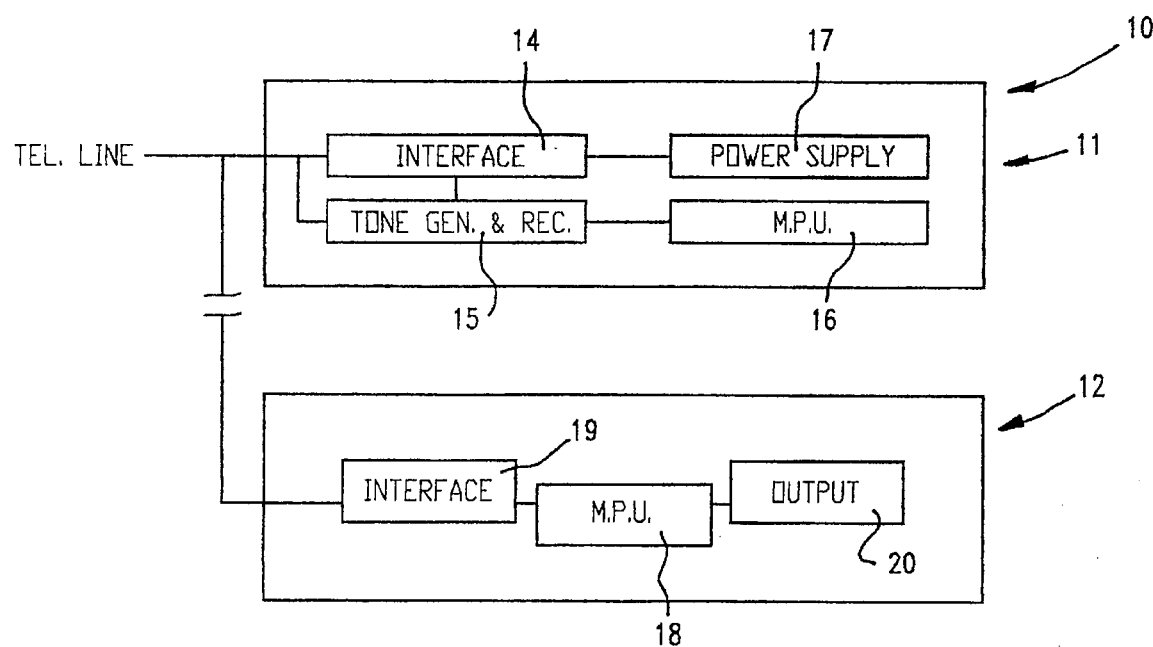
FIG. 1 is a block diagram showing the basic structure of the monitoring system of the present invention.
Figure 2:
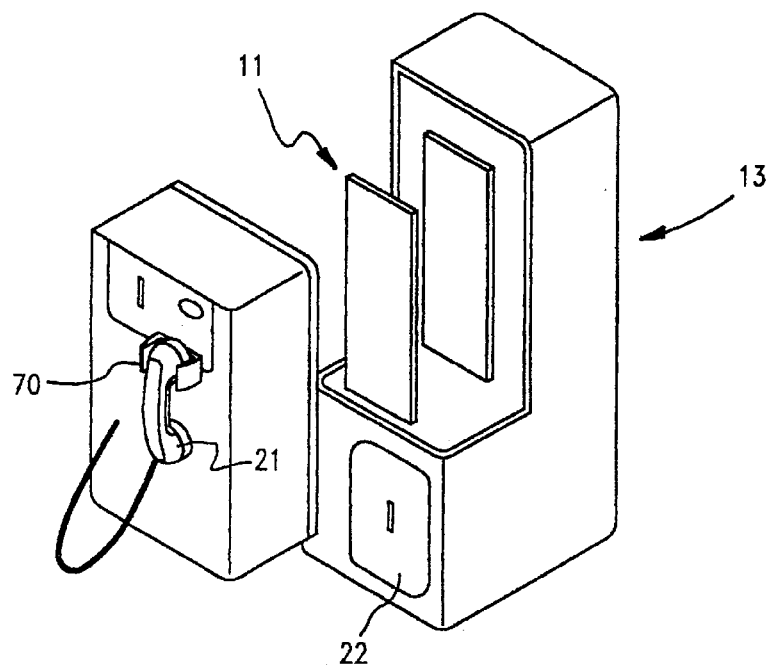
FIG. 2 is a perspective view of a coin telephone station, partially exploded and showing the connection of a remote unit of the system thereto.

The system components will be described with respect to a coin telephone application, although other applications, such as gas and water meters, fall within the purview of the present invention. Referring to FIGS. 1 and 2, the system 10 comprises a host unit 12 and a remote unit 11. The host 12 is located at a centralized location such as an accounting or business office which monitors and controls a number of coin phones 13 via remotes 11 that are mounted in each coin phone 13.

The remote 11 is preferably configured on a single printed circuit board and generally comprises interface 14 (see FIG. 3), tone generator and receiver 15 (see FIG. 5), microprocessor or microcomputer 16 (see FIG. 4) and power supply 17 (FIG. 3) sections. The remote unit 11 establishes a dial-up loop with the host unit 12 via their respective communication means 14 and 19. The dial-up loop can be established over common, two wire telephone lines.

The host 12 generally comprises a host interface which is located in a desktop or other computer, including an output 20, such as a cathode ray tube (CRT), or screen and/or printer. The host interface is also preferably configured on a single printed circuit board and includes a dtmf receiver/transmitter or the like, level adjustment means, a buffer, and control logic. The host interface basically adapts standard personal computer (P.C.) structure with system components, and further provides a means of connecting, for example, approximately four outside telephone lines. Multiple host interfaces may be associated with each host computer, thus, providing additional outside lines of communication. Additionally, with download and local area network (LAN) capability, communication with several hundred thousand remote units is possible.

In the coin phone application, the remote unit 11 functions primarily as a "coins collected" totalizer and call-type recorder. Money that is deposited into and collected by the coin telephone 13 is continually added to a running ESCROW and reported at predetermined times to the host 12. The host 12 drives a printer, and/or video output, and creates a real-time coin box total. The remote unit 11 also calls and reports trouble conditions, statistical data, etc. to the host unit 12 at selected times. When the host 12 answers, the remote unit 11 transmits data and then automatically disconnects. In cases where a caller attempts to use the coin phone 13 during a reporting sequence, the remote automatically disconnects itself and restores the line so that the caller is assured phone service. In summary, the system meters the coin box, automatically reports the amount to the host unit 12 and provides computed statistics as desired.

2. Line Interface

Figure 3:
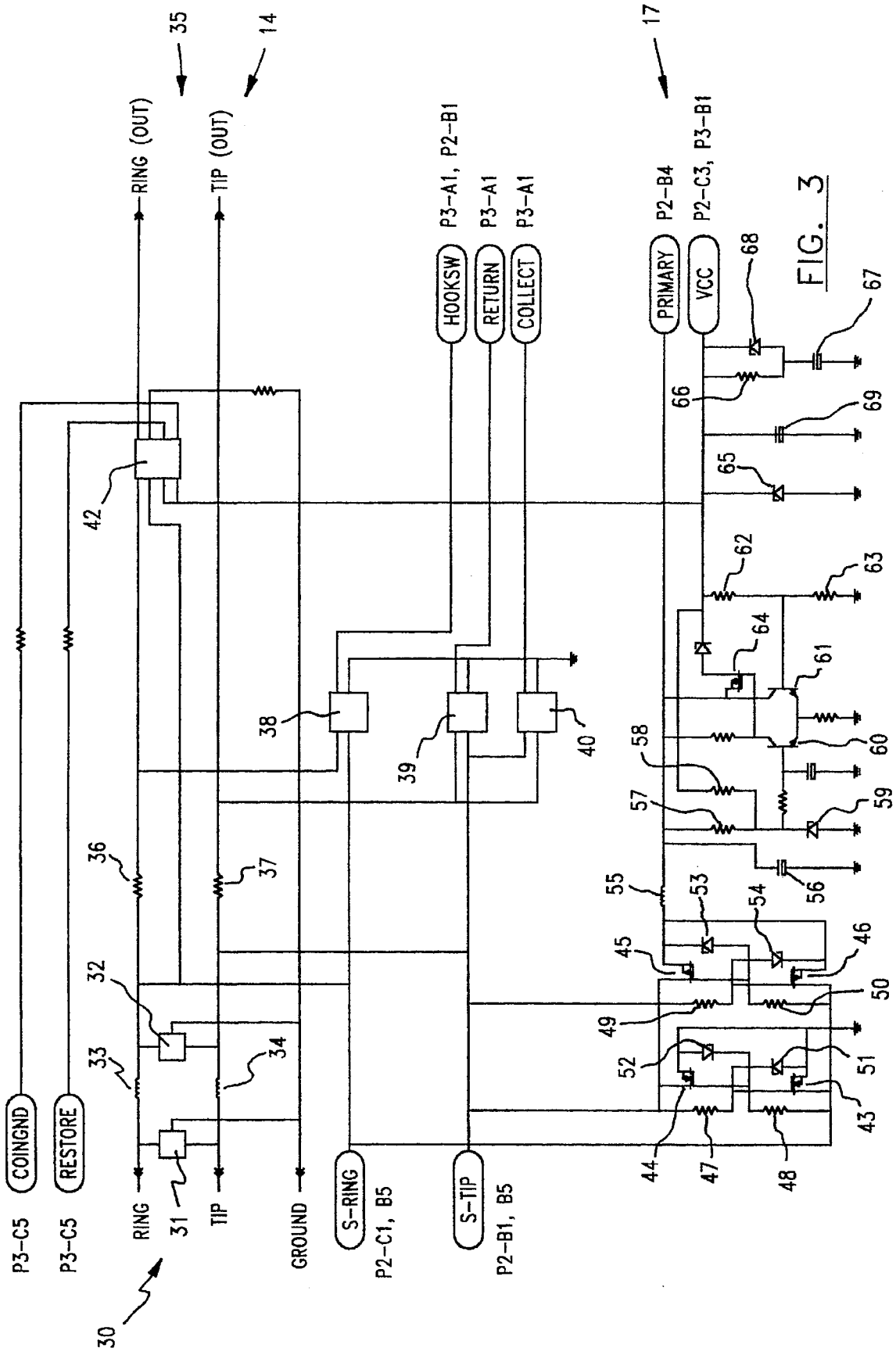
FIG. 3 is a schematic circuit diagram showing the interface and power supply sections of the remote unit.

FIG. 3 shows a circuit section which provides line interface and power supply functions for the remote apparatus 11. The line interface circuitry, residing generally in the top portion of FIG. 3, further functions to provide surge protection, voltage and current level detection, initial rate provision, and line control.

The positive and negative (Tip and Ring) conductors of the outside telephone line, hereinafter the telephone line, are coupled to connector 30 (J1) with a local earth reference (Ground). Connector 35 couples the Ring and Tip signals from the remote device 11 to the pay telephone system 13. Protection from a power surge through the outside telephone line, for example from a lightning surge, is provided by a primary surge protector such as a spark gap 31, a secondary surge protector, such as a surge protector 32, and resistors 33 and 34. The spark gap 31 provides slow surge protection for clamping high current. The resistors 33 and 34 provide current limiting for the incoming surge. Surge protector 32 is a fast operating surge protection device which functions to clamp the leading edge of any surge missed by the spark gap 31.

Resistors 36 and 37 and optoisolators 38, 39 and 40 are interconnected to detect voltage and current levels input to the remote over the telephone line. The current through resistor 36 indicates whether the telephone 13 is being utilized by a customer or otherwise has a closed circuit with the telephone line, a condition commonly referred to as "off-hook". Current across resistor 36 saturates the transistor in optoisolator 38 which brings a hook switch signal low over hook switch line HOOKSW, connected to a microcontroller 41, shown in FIG. 4. The current across resistor 37 indicates either that a coin collect signal (positive) or a coin return signal (negative) has been transmitted from the central office over the telephone line to the coin phone 13 depending upon the usage of the phone 13. The direction of the current differentiates the above two signals and brings a collect or return signal low on an either optoisolator 39 or 40, respectively. Optoisolators 39 and 40 are shown connected to microcontroller lines RETURN and COLLECT, and to receiver/transmitter lines S-RING and S-TIP 42.

A solid state relay 42 is shown interconnected in the circuit. The relay 42 provides the initial rate (local call cost)

in order to dial a local call from the coin phone 13 at the remote location. The relay 42 also has a line control function to open and close the outside telephone line. The relay 42 interrupts the telephone line in situations when a customer takes the handset 21 off-hook to make a call during a report phase between the remote 11 and host 12. Thus, the relay 42 restores a dial tone to the telephone line enabling the customer to make a call from the coin phone 13.

3. Power Supply

The power supply circuitry is shown generally in the lower portion of FIG. 3. The system 11 is completely telephone line powered and does not require AC line voltage or batteries. The circuit provides an extended input voltage range of plus or minus 7 to 200 volts D.C. Interconnected with the S-RING and S-TIP lines is shown a full wave bridge comprising N-MOSFET's 43 and 44 and P-MOSFET's 45 and 46. Resistors 47-50 provide biasing voltage for the field effect transistors 43-46, so that they are on at the correct time. Also, diodes 51-54 protect the FET's 43-46, preventing gate source voltage from exceeding 16 volts.

A low pass filter formed by inductor 55 and electrolytic capacitor 56 reduces noise by allowing only DC current through the power supply. Voltage reference is provided by resistors 57 and 58 feeding zener diode 59 to stabilize voltage output at 2.5 volts.

Voltage regulation is provided by transistors 60 and 61 of a differential amplifier which sums the voltage between zener diode 59 and resistors 62 and 63, providing a feedback loop for the power supply. P-MOSFET 64 is a regulation pass element driven by the differential amplifier (60, 61). Zener diode 65 clamps the output voltage to approximately 6 volts to protect the remote circuitry in the event of a failure in the power supply or power surges. A network consisting of capacitor 67, shotkey diode 68 and capacitor 69 maintains power during sustained power losses. Low-leakage electrolytic capacitor 69 provides bulk capacitance for stability. Capacitor 67 is a super capacitor having a significant capacitance, for example 0.022 farads which is charged through resistor 66 in approximately 60 seconds. Discharge is provided through diode 68. The shotkey rectifier 68 keeps the voltage drop cost low.

4. Receiver-Transmitter

Figure 5:
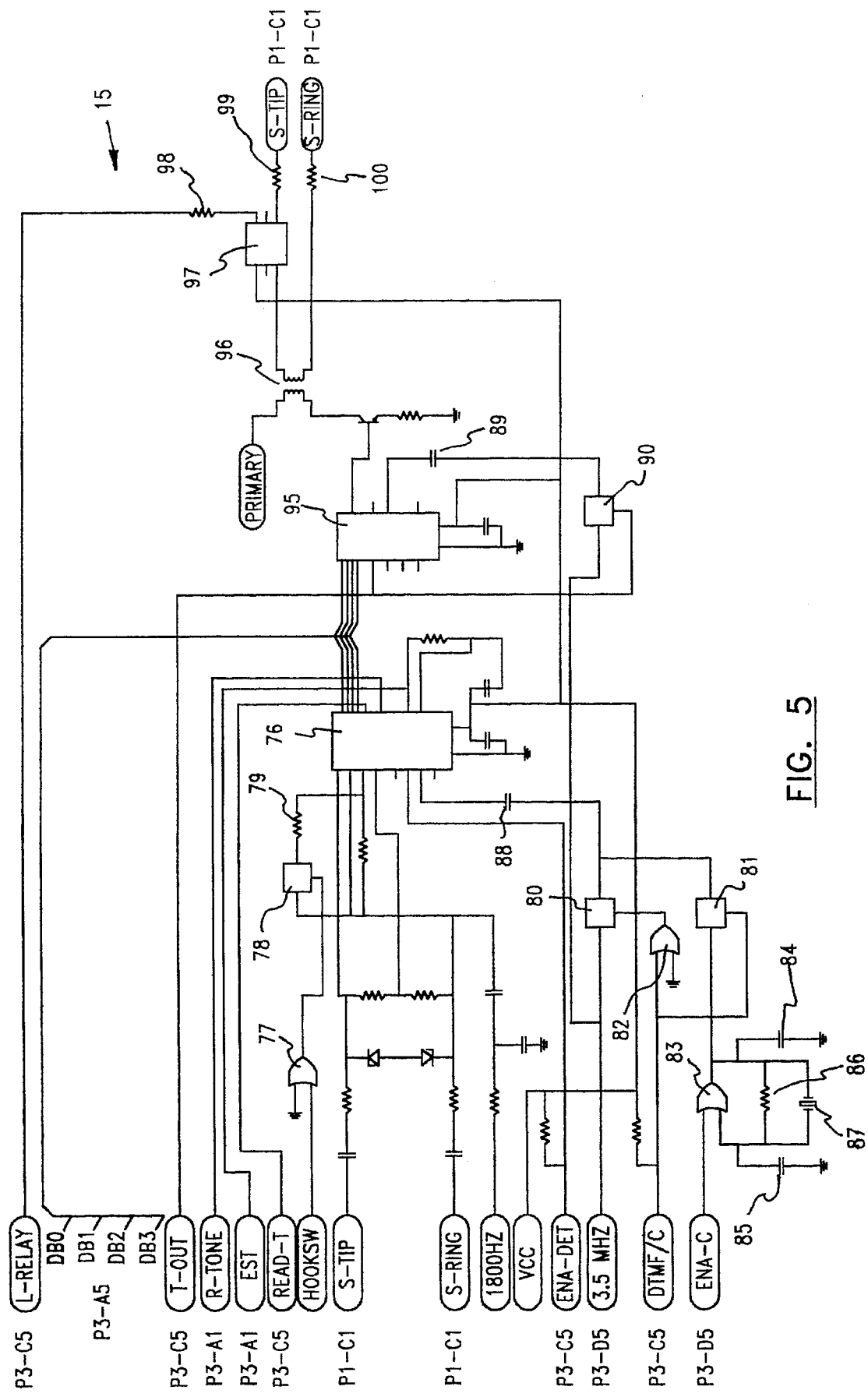
FIG. 5 is a schematic circuit diagram showing the receiver and transmitter section of the remote unit.

FIG. 5 shows the receiver and transmitter sections of the remote device 11 which generates and receives dual-tone multifrequency (dtmf) tones for use by the remaining elements of the device 11. The receiver section, generally shown at the left side of FIG. 5 comprises a dual tone decoder 76, high dynamic range gain control circuitry, and clock control circuitry. The gain control circuitry includes a Quad NOR-gate 77 connected to line HOOK-SW, a Quad Switch 78, and a 499K ohm resistor 79. Gain is lowered when the coin phone 13 is off-hook to prevent dtmf tones generated by the phone 13 from overdriving the receiver 76. Gain is increased during transmission (for example, a report) from the remote 11 to the host 12 to allow the remote 11 to detect the reply tones (command tones) from the host 12.

The clock control circuitry also is connected to and controls the receiver 76. A low value capacitor 88 (33 pf) couples the clock circuit to conserve power. The clock control circuitry includes a pair of analog (Quad) switches 80 and 81, and gated 6.5 Mhz oscillator consisting of gates 82 and 83, capacitors 84 and 85, resistor 86 and crystal 87. Gate 83 is connected to line ENA-C which is connected to the microcontroller 41 to enable the oscillator and to turn it off to conserve power. Analog switches 80 and 81 are also utilized to reduce power consumption in clock selection. This circuit also provides the ability to switch the operating range of the receiver 76 to 3.5 Mhz to detect dtmf keypad tones in the range of 200-1600 Hz from the phone 13 keypad, and to 6.5 Mhz to detect coin tones (dual or single) of 1800-2200 Hz from the phone 13 coin detector. Line 1800 Hz injects an 1800 Hz sine wave from the microcontroller 41 to the receiver 76 at a predetermined time to decode single frequency coin tones. The circuit is designed to strobe the 200 to 2200 Hertz range of frequencies in order to detect the component frequencies using the filter crystal property of crystal 87 for passing energy of certain looked for frequencies.

The transmit circuitry is also connected to the clock control circuitry via a low value capacitor 89, and via an analog switch 90, which eliminates 3.5 Mhz transmittal and reduces power consumption during periods of nonuse. The transmit circuitry generates dtmf tones which enable the remote to dial (connect) and communicate with the host. The transmit circuitry includes a dtmf generator 95, a line coupling transformer 96, and a solid state relay 97. The transmitter 95 generates tones. The transformer 96 is an impedance matching transformer which matches the line interface resistance of 600 ohms, and is connected to line PRIMARY. Resistors 99 and 100 limit current through the transformer 96 to compensate for current drawn by the power supply during transmission to the host.

The following table shows the dual-tone multifrequencies (dtmf) for each key on the remote telephone keypad. Thus the digit 8, for example, is represented by the 852 and 1336 Hertz pair of frequencies.

TABLE I

| | KEYPAD | | | |
|---|---|---|---|---|
| | | | | Lower Freq. (Hz) |
| | 1 | 2 | 3 | 697 |
| | 4 | 5 | 6 | 770 |
| | 7 | 8 | 9 | 852 |
| | * | 0 | # | 941 |
| Upper Freq. (Hz) | 1209 | 1336 | 1477 | |

Figure 4:
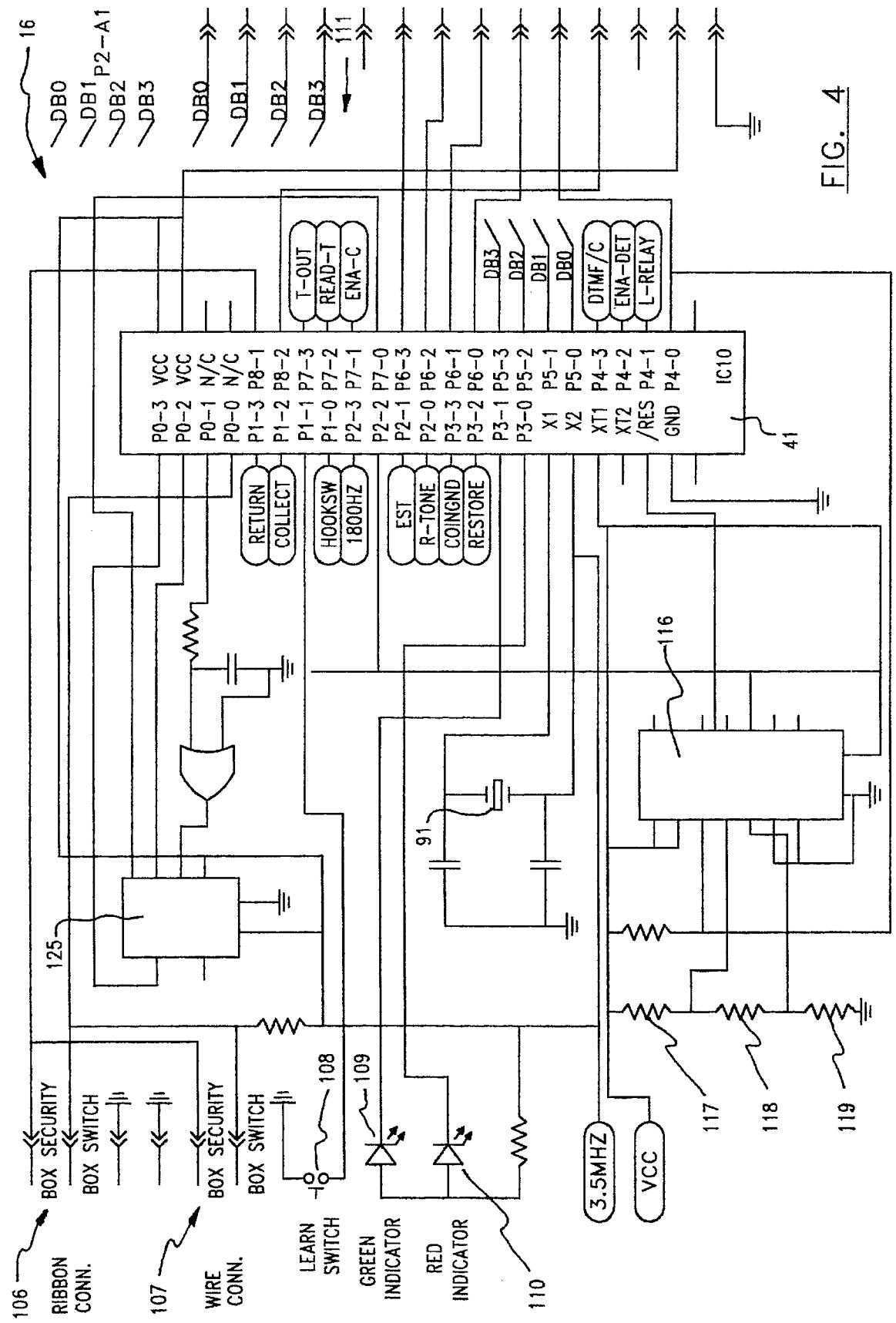
FIG. 4 is a schematic circuit diagram showing the microcontroller section of the remote unit.

FIG. 4 shows, generally, the microprocessor section of the remote device. This section consists of an external interface, power supply monitor and watchdog circuitry, memory, and a microcontroller 41. The external interface includes ribbon and wire tape connectors 106 and 107 for mating with a coin box out and security switch, a learn switch 108, green and red light emitting diodes (LEDs) 109 and 110, a connector 111 for interfacing peripheral equipment to the microcontroller 41 via a four bit data bus, and interface lines including power and ground. The coin box out switch located on the coin telephone 13 is a normally closed switch, such that when the coin collection box 22 is in its normal position in the coin telephone 13, the switch is closed. When the coin box is removed from the telephone 13, for example, for collection of coins by the telephone owner, the switch is opened. This operation is detected by the microcontroller through either connector 106 or 107, so that appropriate action may be taken. The learn switch 108 provides an operator input means for initializing the remote 11 circuitry. And, the LEDs 109 and 110 provide visual indications of the initialization process.

The power supply monitor and watchdog circuit comprises microcontroller monitor 116 connected to the microcontroller 41 and to line VCC through resistors 117, 118 and 119. This circuit monitors the power supply voltage for loss of power. When the power supply voltage drops below 2.5 volts, the microcontroller 41 is held in a reset state to prevent extraneous operation. A watchdog input pulse (see routine KICKD below) provided by the microcontroller 41 prevents the watchdog circuitry within microcontroller monitor 116 from resetting the microcontroller 41. In the event that the microcontroller fails to provide a watchdog pulse within 1.2 seconds, the microcontroller monitor 41 and the remote circuitry is re-initialized.

The memory section 125 comprises a nonvolatile memory, such as an electronically erasable programmable read-only memory (EEPROM) which is connected to the microcontroller 41 and used to store data.

The microcontroller 41 is a programmable state machine device that controls all of the aspects of the operation of the remote circuitry 11 via program logic instructions described below. The microcontroller 41, preferably a 4-bit microcomputer, includes a central processing unit (CPU) area and an electronically programmable read-only memory (EPROM) area. A CPU random access area (RAM) is further divided into three memory banks. The three banks are defined at the setup time of the program as follows:

BANK 1—referred to as MBE0, includes computing memory definitions, variables, status of the remote, and bit maps.

BANK 2—referred to as MBE1, includes memory definitions for reporting to and from the host such as phone diagnostics and RAM status memory bit maps.

BANK 3—referred to as MBE15, includes definitions for input/output bit mapping.

Furthermore, the CPU RAM includes 32 registers used to perform various numerical instructions including arithmetic, logical compares, move and store data in and out of specified memory addresses.

Aside from the memory banks, the CPU RAM can be generally thought of as having four areas:

1. A system area for maintaining various computer flags;
2. A report memory area having data to be sent to and received from the host;
3. A host command area; and
4. A host phone number area having the long distance number of the host telephone company's database computer.

The remote 11 is controlled by one set of program instructions whereas the host computer 12 communicates with the processes data received from the remote 11 via other programs (discussed below) not available to the remote 11.

In order to initialize the computer program, an object code version of the software is resident in the remote microcontroller, CPU RAM, and its nonvolatile memory such as an EPROM (or PROM) areas. This is done by downloading the software into a memory board during the manufacturing process. During this downloading process, the CPU memory map is installed along with initial setup configurations such as:

Light emitting diode (LED) port defines (P3 lines zero and one);

Ground and restore defines (P3, lines two and three);

Interface to the dual-tone multifrequency (dtmf) receiver and transmitter (P4, P7);

Interfaces for static memory serial ports defines of RAM static memory data;

Defines of lines or ports to be polled for activity (P0, P1, P2, P5); and

Special dialing commands and report parameters, such as time and length of a call or report.

5. Remote Operating Modes

The remote 11 has four basic operating modes: on-hook mode, off-hook mode, reporting mode and learn mode.

A. ON-HOOK MODE: In this mode, most of the systems of the remote 11 are in idle or shut-down to conserve current consumption. The microcontroller 41 is in a halt mode, or in stop, most of the time. The interruption to the halt mode is in the timer interrupt (see the TIMEINT service routine below) which generates an interrupt every 20 milliseconds. At this time, the remote software program activates itself, checks for any activity, keeps track of real time, and then shuts down and returns to halt mode to conserve power.

B. OFF-HOOK MODE: The off-hook mode is entered when the microcontroller 41 detects an off-hook signal (from the OFF-HOOK switch cradle 70) operating. In this mode, the remote program first looks for coin tones. Secondly, it alternates between coin tones and dtmf tones for the first seven dtmf tones detected. After the first seven tones are detected, the remote program reverts to only looking for coin tones. If no keypad digits on the coin phone 13 are pressed for approximately 10 seconds, the remote program also reverts to looking just for coin tones. When the program detects a coin tone or a dtmf tone, it listens to that tone until the tone terminates and then it performs the proper operation. If the tone is a coin tone, the program adds that coin denomination into a temporary register which keeps track of all the coins that are deposited during a single call or off-hook occurrence.

Any dtmf tones that are detected, are decoded in order to determine call types. The basic call types are: seven digit local call, 0+ call where a zero is pressed first, operator assisted or collect call, 1+ call where a 1 is pressed first, direct dial call, and two types of user defined calls. The two user defined call types are seven digits that are defined by the host. The remote keeps track of these calls. Additionally, the remote 11 keeps track of how long the station is off-hook mode occurs and the real time until the next report to the host 12.

The remote 11 also looks for a collect or return signal (via the software routine COLRET described below) from the telephone company central office. If the coins are collected, according to the collect signal, the remote program then adds the coins in the temporary register to the current box count. If they are returned, it discards them, because the coins are returned to the pay phone 13 user.

If there is no collect or return signal at the end of the call, the remote program will discard the coin amount, and increment a counter that counts how many times a collect or return signal was missed and how much money was discarded.

Upon completion of the off-hook mode, the receiver 21 is placed back on-hook. The remote 11 then goes back to the on-hook mode and to the idle state.

C. REPORTING MODE: The reporting mode is entered under the following circumstances:

1) The time to call-in has expired, real time expiration;
2) The box full amount has been reached (the nickels to next call count reaches zero which indicates the box has filled to a predetermined level);
3) detection of an opening of the box-out switch (box collect indication);
4) a service report which is instigated by someone pushing a learn button 108 on the remote unit 11, or polling the remote;
5) box-out collection (16); and 6) missing collect/returns (16).

The remote 11 must first go off-hook, then it dials the telephone number of the host 12 (located in memory), and listens up to thirty seconds for a response from the host. The remote briefly waits for the network to connect it to the host 12. The host 12 responds to the remote 11, by sending an acknowledgment tone after waiting for thirty seconds. The remote program then sends two information packets containing the information gathered during the off-hook mode. The host 12 responds with up to four packets of data to the remote 11. Normally, only one packet is sent, and which tells the remote 11 the percentage of box full and time until the next report. The type of information that may be transmitted includes user-defined call types, primary host phone number, secondary host phone number, and the operating characteristics. If the host 12 doesn't send an information packet, the remote 11 will continue to use the existing information to operate.

After the data is transferred, the host hangs up, the remote hangs up, and the report is saved in the remote's nonvolatile memory 125. If for any reason, the attempt to dial the host does not succeed, the remote will go into a retry algorithm. Three minutes after the first unsuccessful attempt, it will try again; if it does not succeed in the second attempt, it will try a third time; and thereafter, if not successful, it will wait an hour, this time by dialing the host number up to three times, three minutes apart.

D. LEARN MODE: The Learn mode is used by a phone service technician to initialize the remote 11. The learn mode is entered by pressing the learn switch 108 and taking the pay telephone receiver 21 off-hook. The technician dials the phone number of the host 12 and the host 12 will then respond to the remote 11. Next the remote 11 responds with a data transmission packet (of up to 16 bits or 4 nibbles of data) indicating an initialization or set-up mode to the host 12. The remote will then connect the pay station 13 to the telephone line and listen for a 10 digit identification number dialed by the technician. Meanwhile, the host 12 also listens to the 10 digit identification number. After the last number is pressed, the remote 11 acknowledges to the host 12 indicating that the 10 digits have been entered. The host 12 then acknowledges the remote. If the digits do not match, the host 12 sends a NACK and the technician can re-enter the 10 digit identification number sequence. The host 12 will then acknowledge if everything went correctly. If not, the host 12 signals the technician to retry. When successful, the host 12 will send to the remote 11 all information parameters the remote 11 needs to operate, such as, the next time to make a report to the host 12 (in the first packet), and the user defined telephone numbers (in the second packet). Finally, the host 12 will send the completion (end flag) of the learn parameters, host number and default. When the host 12 acknowledges that the remote 11 has successfully received the parameters, the remote 11 will flash both the green and the red LEDs to indicate to the phone service technician that it has completed the learn mode successfully. If at any point the learn mode is not successful, the remote 11 will restore the information it had previously sent and then light the red LED for 15 seconds to indicate to the service technician that the learn mode was not successful.

6. Overview of System Operation

The actual sequence of functions performed by the remote 11 hardware and software is dependent upon varying use circumstances, such as the happening of certain events including a customer making a call from the remote phone, the type of call (i.e. credit card, direct, operator assisted, long distance, call-in from the host), whether a report is to be made to the host 12 and/or written to the remote nonvolatile memory 125 (EEPROM), whether coins deposited in the hopper need to be counted, and the occurrence of software interrupt service requests (ISRs). Therefore, the remote's 11 functioning is dependent on external events and it is appropriate to describe a hypothetical sequence of computerized events.

Referring to FIGS. 9 through 43, on start up, the initialization of constants, variables, interrupts, timers, counters, flags and definitions are performed, as part of the INIT and INIT3 routines. Then control of all of the other subroutines is given indirectly to the MAIN polling loop as described below. The MAIN polling loop monitors the learn switch 108 (LEARN-SW) for an "on" signal to branch to the LEARN routine which, in turn, performs the initial remote phone setup for communication with the host computer 12. The learn switch 108 is a physical button on the remote board 11 which can be depressed by a phone technician in order to initialize the remote's functioning. As described previously, this is the learn mode which is normally a one time operation to set up communication with the host 12 and for verification of the remote's phone number, the host phone number and other initial report parameters.

The MAIN polling loop, in turn always calls the KICKD routine to prevent a reset such as performed by the INIT routine from occurring. KICKD prevents the reset by stopping the external timing function of the watchdog circuitry 116 as described previously. The watchdog circuitry 116 causes the INIT routine to be performed every 1.2 seconds unless the KICKD routine resets its associated timer. The purpose of the watchdog is to reset the program in case the microcontroller 41 is not executing the proper sequence. The 1.2 second time period is preferred for the external timer to reset unless otherwise prevented by the KICKD routine. The important function of the polling loop is to ensure that all possible events are polled before going into a HALT mode. The HALT instruction saves telephone line current drain, and causes charge to build up on capacitor 67 periodically according to the cadence time provided by the TIMEINT interrupt service routine which causes the microcomputer to resume operation after 20 msec. This power conservation technique involving both hardware and software allows enough power to be accumulated on capacitor 67 for the remote 11 to function regardless of the continuity of telephone line current.

Whenever the OFF-HOOK switch is set, the IEO interrupt is activated and causes the OFFINT routine to be performed. The interrupt service request (ISR) routine OFFINT checks for the off-hook condition lasting more than 120 msec. If it does, the OFFINT ISR branches to the INIT3 routine in order to disable all of the interrupts except the 20 msec. timer interrupt (IETO) and the master interrupt (I) which are enabled. Otherwise, it does not branch to INIT3 but continues its function as an interrupt by enabling its associated IEO interrupt.

During an off-hook condition, INIT3 also checks to see if the remote 11 is in the process of reporting to or from the host 12. If it is, it turns the report off and sets a flag CALI that the customer's call is to be interrupted momentarily to get the dial tone and give the line back to him (her). In the meantime, the contents of the report that were saved to the nonvolatile memory (such as the EEPROM 125) are restored for use by programs. In any circumstance, the INIT3 routine returns control to the beginning of the MAIN polling loop.

Next, the MAIN polling loop checks the flag SRPT to determine whether to call the host to make a service report. A service report includes various data about telephone calls made from the remote, the charges, types of calls, coins deposited and amount of money in the coin box holder of the remote, and whether service is needed, for instance.

Whenever a service report is to be sent to the host, the DIAL routine is branched to from the MAIN polling loop to dial the host 12 phone number. The dialing is accomplished by sending the digits as dtmf tones for 100 msec. through Port 7 to the dtmf crystal oscillator Q2 91 (operating at 3.5 Mhz) and dtmf transmitter 95, as provided by calling routine SENDT (the send tone). After the dialing of the host 12 telephone number, the DIAL routine calls the SENDRP routine to arrange for the report to be sent to the host 12.

The SENDRP routine waits for an acknowledgment tone (status 1 bit 1 in variable STAT1.1) from the host 12 signaling it is okay to send the report. If it isn't okay to send the report, it sets flag DEAF (meaning there was no acknowledgment), and counts the number of times it has tried to send the report. It also sets the time to retry sending the report and it saves it to the nonvolatile memory 125.

In order to determine whether there is an acknowledgment that the host 12 is ready to receive a report, the SENDRP routine calls the WACK30 routine to wait thirty seconds for the host 12 to indicate whether it is ready to receive a report.

The WACK30 routine turns on the dtmf decoder and receiver 76 and listens for a tone on Port 4 by calling the DTMFW5 routine looking for a tone during five second intervals. The DTMFW5 routine calls LISTEN to actually listen for a tone from the host 12. The LISTEN routine is described elsewhere herein. DTMFW5 waits for approximately 5 seconds to receive a tone from the host 12 and returns to WACK30 to determine if the tone indicates an acknowledgment that the report was transmitted to the host 12 successfully or not. If not okay, then it either retrys to send the report or returns to the calling program if it is timed out. However, if the acknowledgment is okay, then SENDRP continues sending the report until it is finished. SENDRP sends the report by calling the routine SLOOP which, in turn, clears the data word checksum variables CHECK1, CHECK2, CHECK3, and CHECK4 and sets the least and most significant nibble (4 bits) counters R-CNT-L, and R-CNT-H, respectively. SLOOP then synchronizes with the host computer by waiting 100 msec. before calling the routine SENDT. SENDT, in turn, sends tones representing a nibble (4 bits) of data at a time to the dtmf transmitter 95 along port 7. SLOOP continues to call SENDT to send the data until all nibbles in the data packet are sent. After each data packet is sent to the host, SLOOP calls the routine CRC16 (described elsewhere herein) to compute the checksums, then sends the 4 checksums representing the sum of the digits in each nibble by calling SENDT, then waiting for an acknowledgment from the host by calling WACK10 (similar to WACK30, as previously described). If the transmission is unsuccessful, SENDRP continues to retry to send the report data packets until it is successful, or until the host fails to acknowledge, in which case the DEAF bit is set in order to retry sending the report at a later time. Two packets of data constitute a report and each packet has 4 nibbles, each nibble having 4 bits. When finished, it returns control to DIAL where it was called from and relinquishes the phone line by shutting down the dtmf crystal oscillator Q2 91 and dtmf receiver 76, and the transmitter 95. From DIAL, the program eventually branches to the beginning of the MAIN polling loop.

The following table describes important conditions to polled:

TABLE II

| Function | Variable | Location | Polled by: |
| --- | --- | --- | --- |
| Power Failure | POW-FAIL | port 2, bit 2 | POWINT |
| Establish Tone | EST-SW | port 2, bit 1 | LISTEN |
| Receive Tone | R-TONE | port 2, bit 0 | LISTEN, CTWAIT SCWAIT |
| Return Coin(s) | RTRN-SW | port 1, bit 3 | COLRET |
| Collect Coin(s) | LEARN-SW | port 1, bit 2 | COLRET |
| LEARN (setup host Communications) | LEARN-SW | port 1, bit 1 | MAIN POLL |
| Off Hook | OFF-HOOK | port 1, bit 0 | MAIN POLL, TIMEINT, OFFINT, COLRET |
| Coin Box is out of its Holder | BOX-OUTS | port 0, bit 0 | TIMEINT, COLRET, BOXINT |

7. Detailed Description of the Remote Software Routines

The following description is also made with reference to FIGS. 9 thru 42.

Figure 9:
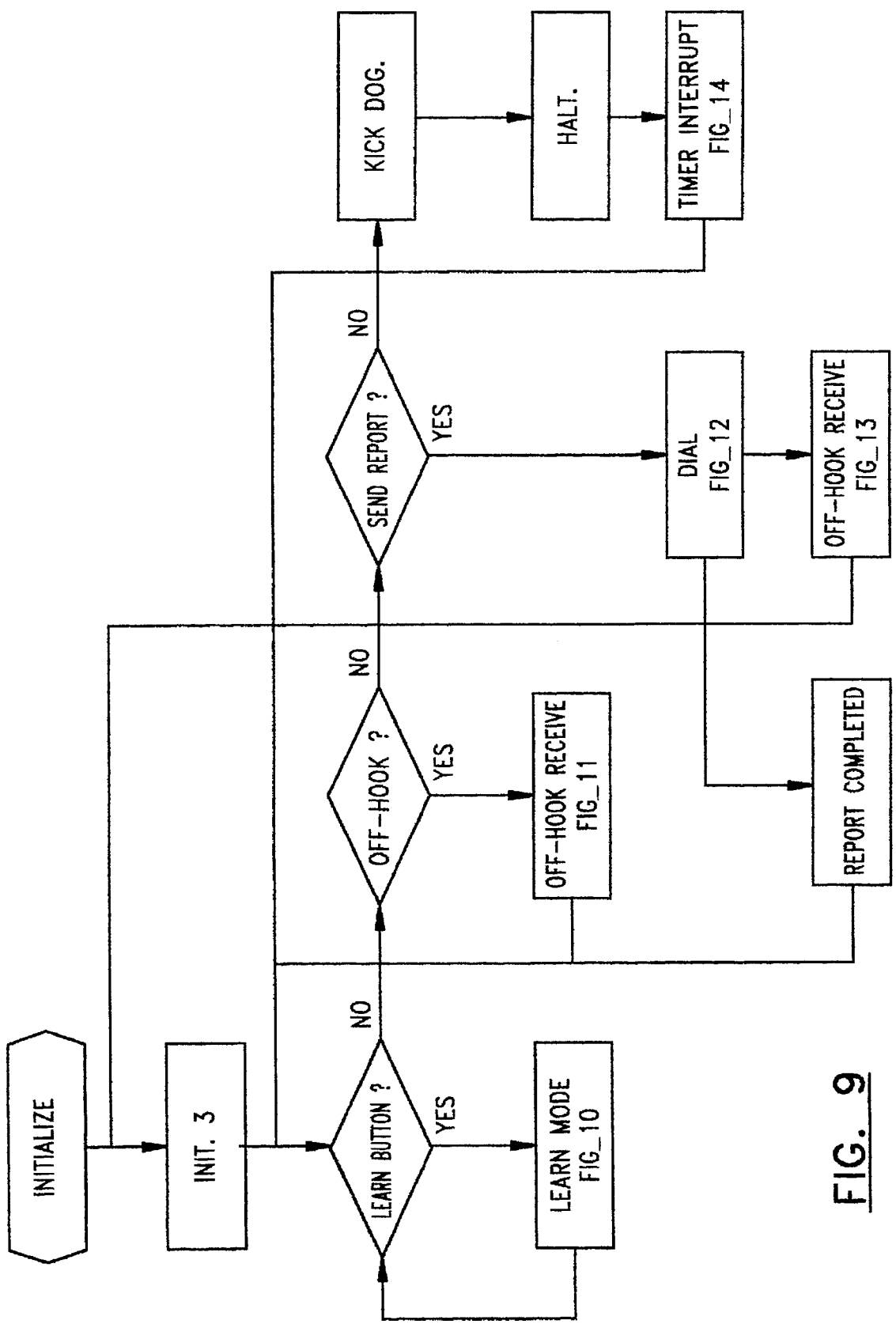
FIG. 9 is a flow diagram showing the steps of a main polling module of the remote unit software.

Referring to FIG. 9, the INIT3 routine initializes the setup code on power up or reset as called for by the watchdog 116. It starts the CPU clock and sets up an event counter to interrupt at 20 msec. intervals, provides for restoring the nonvolatile RAM memory and buffers in case of a power failure, and turns the green LED 109 on for 200 msec. when power is up.

The INIT3 routine is started when the coin phone is taken off hook by someone attempting to make a call during a report sequence. It gives the phone line to the coin phone customer or caller and provides a dial tone. It is branched to from the OFFINT off-hook interrupt service routine whenever the OFF-HOOK switch signal is active low (2.5–3 volts) for more than 120 msec.

Figure 10:
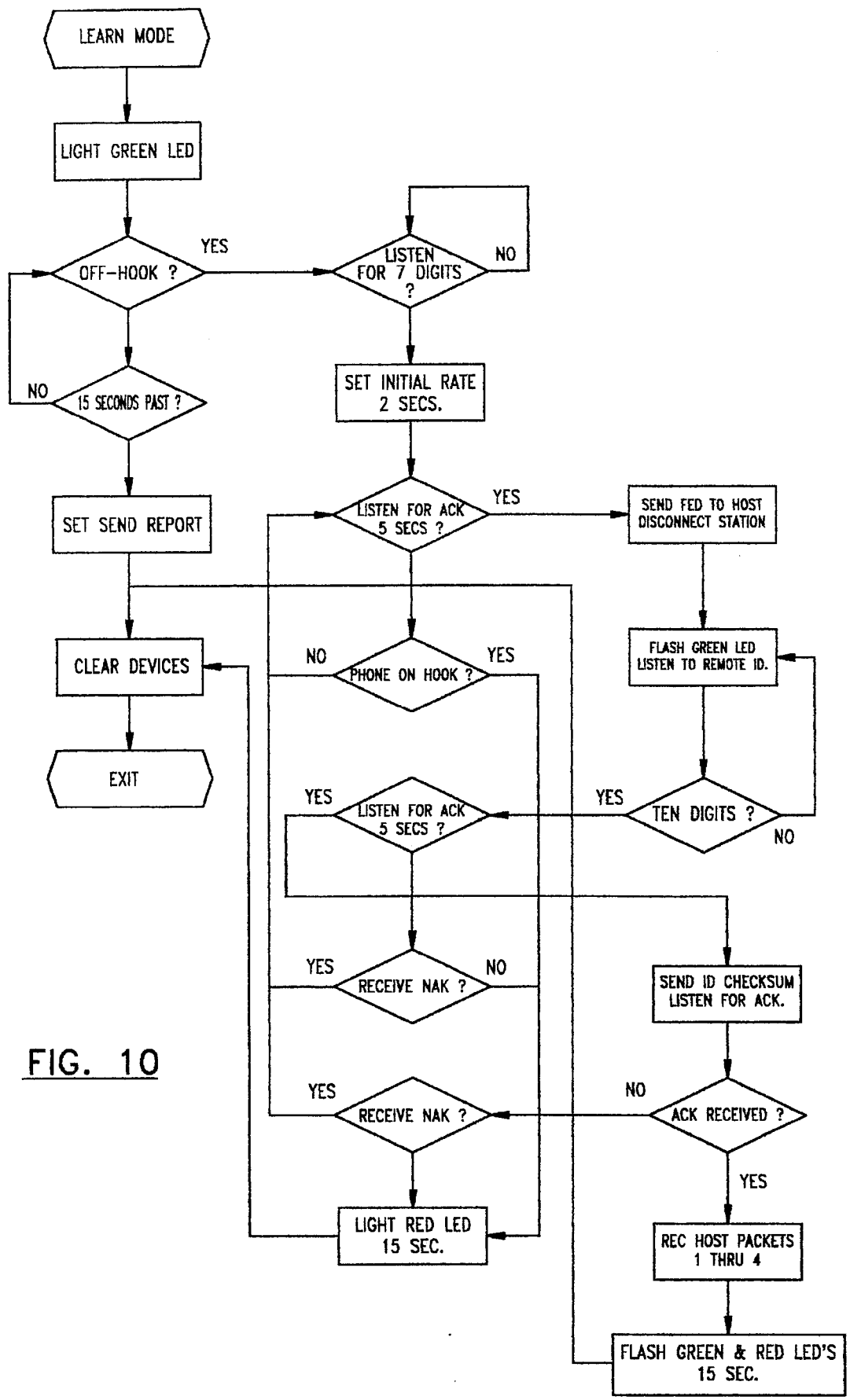
FIG. 10 is a flow diagram of a learn routine of the remote unit software.

The MAIN routine is the event polling loop routine or controlling program shown in FIG. 10. All other routines that are branched to from it return to the beginning of this polling loop. It functions to ensure that all possible events are polled before going into a HALT (stop) mode, by calling the KICKD routine to prevent a reset by the INIT routine during the polling.

This polling loop constantly monitors the remote learn switch (LEARN-SW) 108 to determine if a phone technician is dialing out from the remote phone 13 to initialize the remote 11 communication with the host 12. Depending on events, the main polling loop branches either the LEARN, OFF-HOOK or SENDRP modules (routines) which in turn call other routines as needed. After any of these three branched to routines are completed, control is returned to the beginning of the MAIN polling loop. The final instruction of the polling loop is a HALT to wait for the next 20 msec. timer interrupt IET0 to perform the TIMEINT service routine. The HALT is intended to conserve power and causes the current consumed by the microcontroller 41 to be reduced for approximately 20 msec. each time a HALT instruction is performed. Upon resuming, IET0 calls the TIMEINT routine, then the MAIN polling loop starts again at it's first instruction which is to call the KICKD routine. As such, the MAIN polling loop program monitors and controls all of the remote's software operations, except the interrupt services which independently monitor or time various events which are described herein.

Referring to FIG. 10, the LEARN routine is branched to from the MAIN polling loop whenever the learn switch LEARN-SW bit is set to active low (depressed). Learn mode allows two functions: 1) a technician initiated report, and 2) an initialization of the remote's 11 command parameters.

Both require intervention by an external control of the remote unit 11. The Learn mode is entered by depressing the learn button 108. If there is no further action for 15 seconds, the remote 11 will set the report flag and exit the learn mode, to send a service report.

If the hook switch is lifted, the remote 11 listens for seven digits to be dialed then asserts the initial rate relay, allowing a local call to complete. The remote 11 then listens for an acknowledge from the host computer 12. On hearing the acknowledge, the remote 11 responds with the tones "F E D" indicating to the host 12 that the remote 11 is initiating a learn mode. The host 12 then responds with an acknowledge and both are ready for the remote's 11 ten digit identification number to be entered at the coin-phone key pad. The remote 11 and the host 12 listen for the ten digits. On hearing ten digits, the remote 11 then sends an acknowledge to the host 12 to indicate it has accepted ten digits. The host 12 sends an acknowledge to the remote 11 and the remote 11 responds with a four digit check sum. If the check sum matches the host's calculated check sum, the host 12 responds with an acknowledge, indicating that both have the correct identification number. The host 12 then sends the remote 11 command packets 1 thru 4. Packet 1 includes time and dollars to next call. Packet 2 includes user defined call types. Packet 3 includes host phone number, and Packet 4 includes alternate host number.

In effect, the LEARN routine is used to set up initial communication between the remote 11 and the host 12, and is called whenever the LEARN-SW switch is physically depressed indicating a need to perform the LEARN routine.

Figure 12:
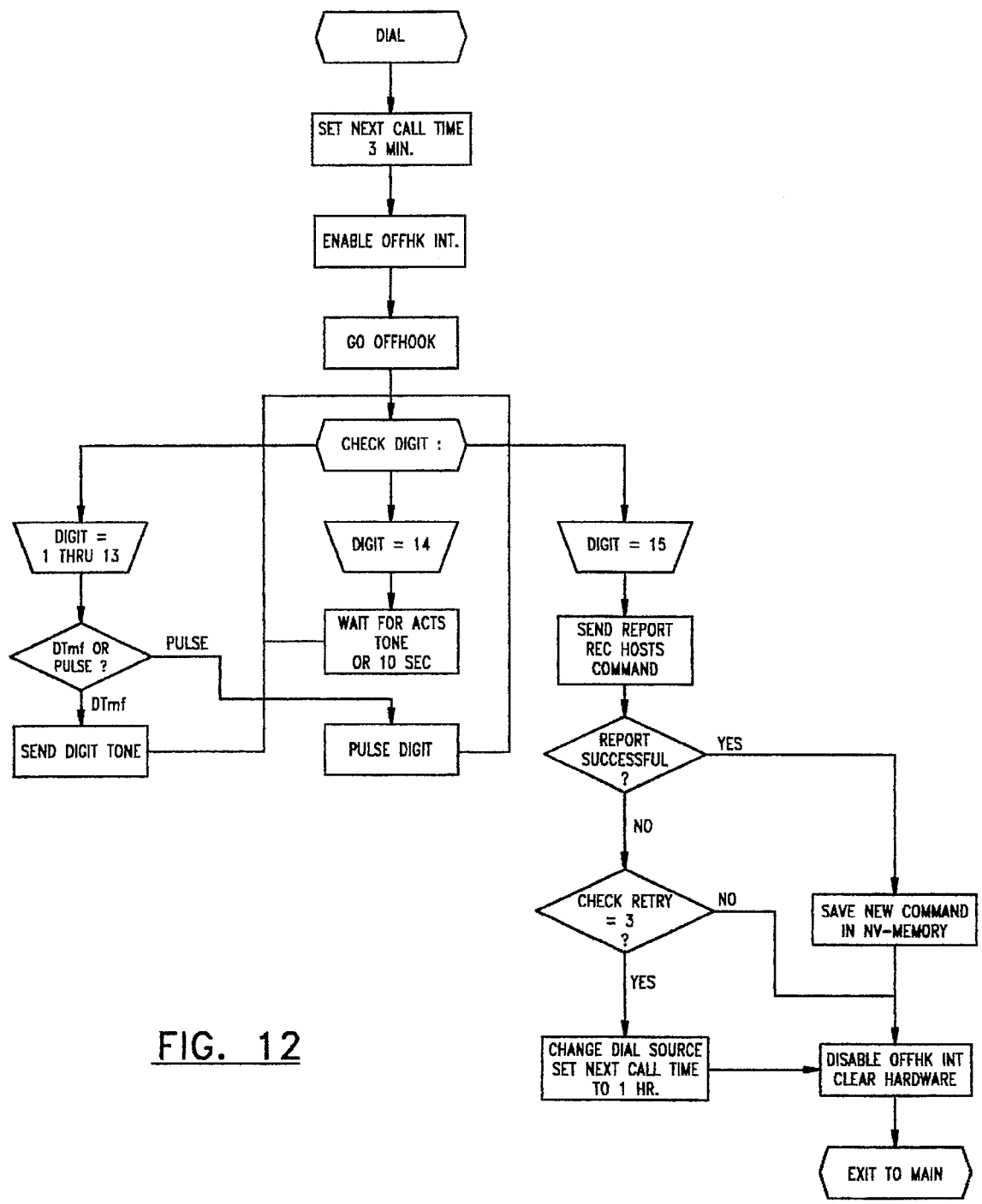
FIG. 12 is a flow diagram of a dial routine of the remote unit software.

The DIAL routine shown in FIG. 12 is branched to from the MAIN polling loop in order to dial the host phone number. DIAL also calls the SENDRP routine to send a report to the host 12. When it finishes sending the report, the DIAL routine relinquishes the phone line, shuts off the dtmf transmitter 95, and returns control back to the beginning of the MAIN polling loop. The dial routine (DIAL) also is a portion of the remote software that receives all command packets sent by the host 12 and saves the new commands to the non-volatile memory. The DIAL software is instigated whenever the send_report flag is set. First, it sets the next report time to 3 minutes in the case of failure, then the offhook interrupt (OFFHKINT) is enabled (allowing the pay station to interrupt the report). The remote 11 then goes off-hook and dials each digit of the host 12 phone number. Each dialed digit is checked for wait, end or dial digit. If the pulse dial flag is set, the remote 11 will pulse dial, otherwise it will dial a dtmf digit.

After dialing, the initial rate is asserted for 2 seconds, and the remote 11 waits for an acknowledge response from the host 12. The remote 11 then sends two report packets to the host 12. Upon successful transmission, the remote 11 receives the host command packet No. 1. Host command packet No. 1 contains next call time, how many nickels to next full box percent, the the number of other host command packets to be sent. If sent, packet No. 2 contains two user defined call types and msc. control bits (increment user No. 1 on collect, increment user No. 2 on collect, post pay station, dial rotary, mechanical totalizer, single tone and host forced collection).

If successful, the remote 11 saves the new commands in non-volatile memory, disables the off-hook interrupt and clears the hardware. If not successful, the remote 11 increments the retry counter. If the retry counter counts to three, the next time to report is set to one hour and the dialed number is switched to the alternate host number. The pattern is as follows: three tries (primary number) three minutes apart, wait one hour, three tries (alternate number) three minutes apart, then back to the primary number after one hour and so on.

Figure 13:
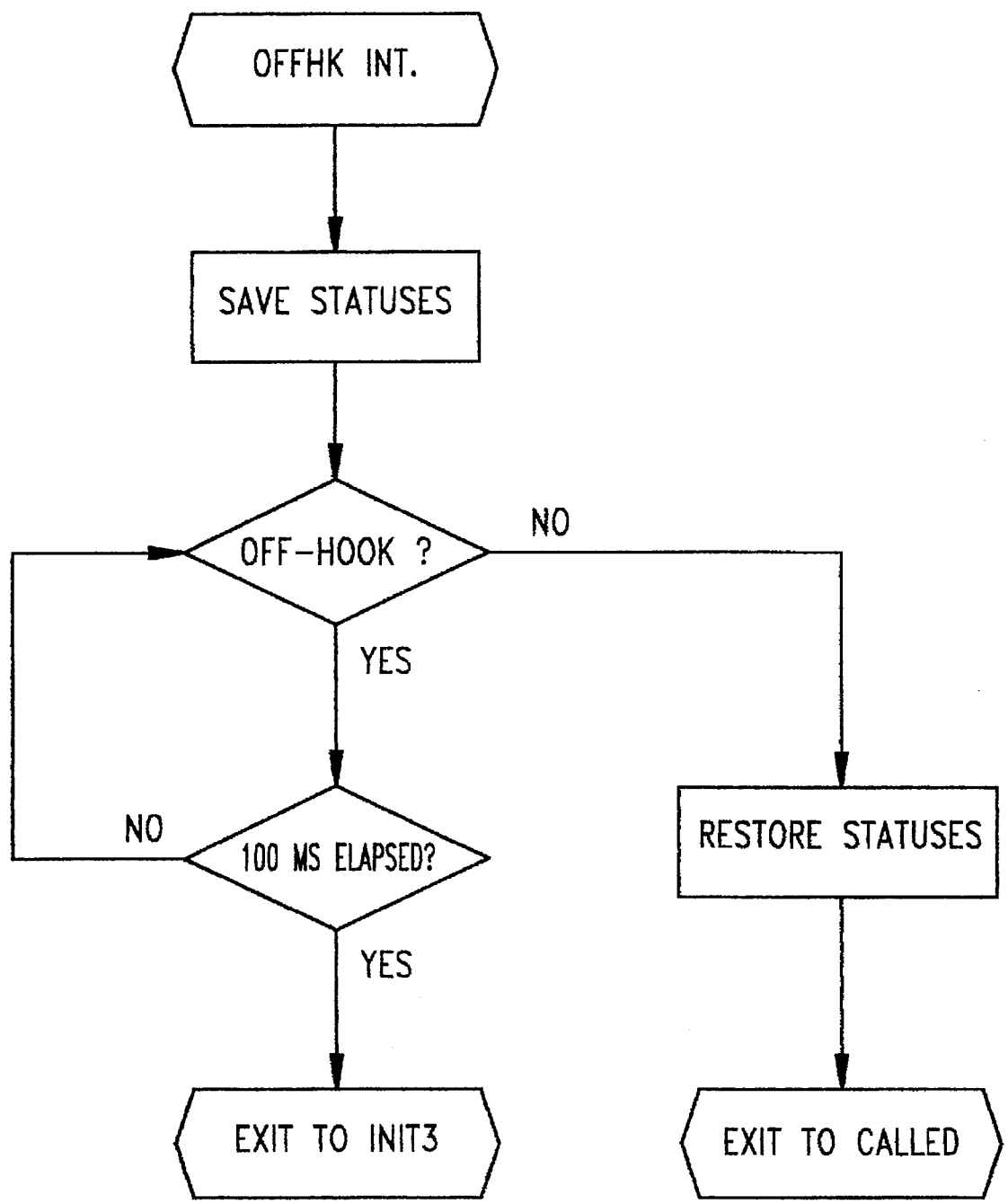
FIG. 13 is a flow diagram of an off-hook interrupt routine of the remote unit software.

Referring to FIG. 13, the off-hook interrupt routine (OFFHKINT) is a portion of the remote software that, when enabled, re-initializes the remote 11 in the middle of a report sequence to allow an off-hook receive to commence. The offhook interrupt is only enabled during the dial routine. This enables the report sequence to be interrupted and service to be restored to the station. The off-hook interrupt routine checks the off-hook signal for validity (active for greater than 100 ms.). If valid, it exits to the INIT3 routine. If not valid, it exits to the called routine.

Figure 11:
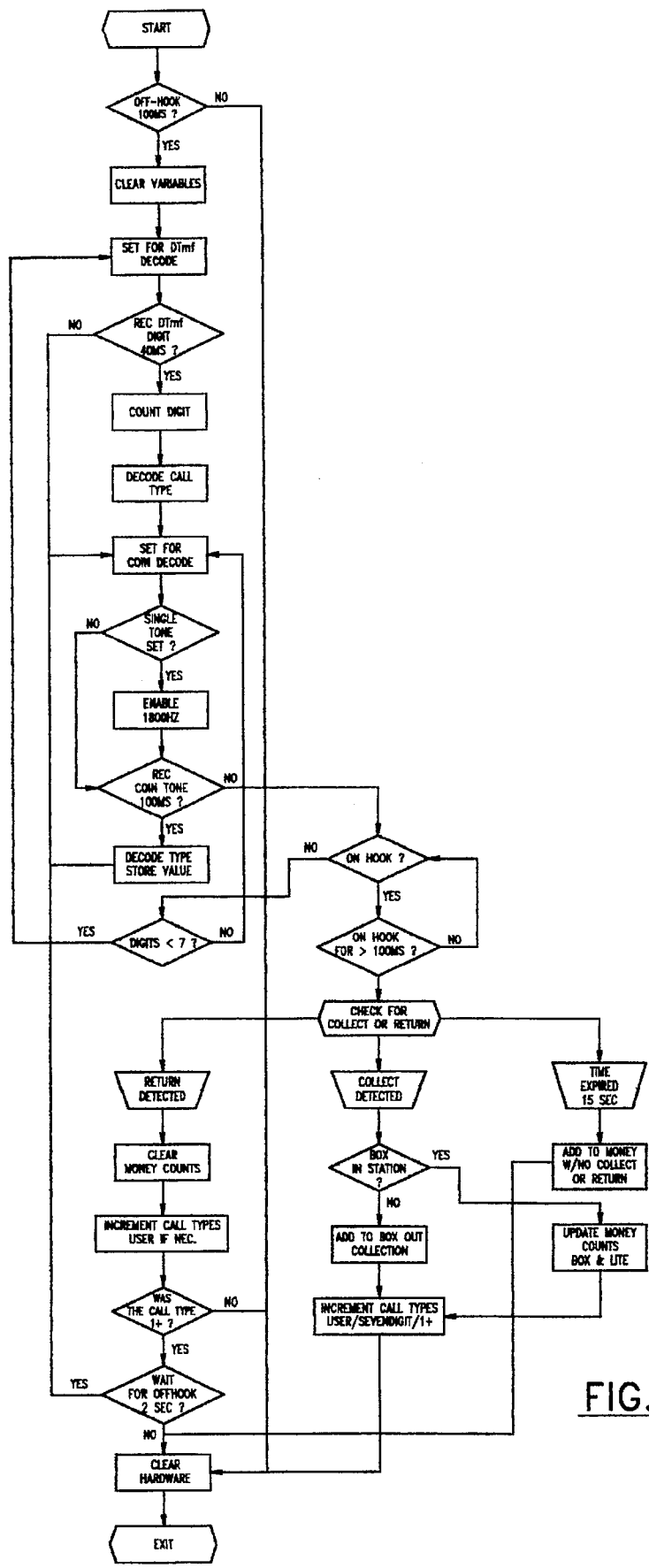
FIG. 11 is a flow diagram of an off-hook condition routine of the remote unit software.

Referring to FIG. 11, an off-hook receive (OFFHKR) routine is a portion of the remote 11 software that collects coin and call information from the coin telephone. When the coin telephone is taken off-hook, the remote 11 listens for coin tones and dtmf digits from the phone. When the coin telephone is placed back on-hook, the remote 11 waits to determine the disposition of the coins deposited. If collected, they are added to the box total, and if returned, they are disregarded.

The off-hook receive software alternates between listening for dtmf tones and listening for coin tones, until either no dtmf digit has be received for 15 seconds or seven dtmf digits have been received. Then the remote 11 will only listen for coin tones. After a dtmf digit is received, the remote 11 checks it for call type match. If a single digit mismatch occurs, the call type is eliminated as a possible call type at the end of the call. All valid call types are incremented if the coins are collected. Only those marked for all attempts are incremented if the coins are returned.

If no collect or return is detected for 15 seconds after call completion, the remote 11 then adds the coins to a missed collect return count and exits the off-hook receive routine. If the call type is a 1+ type call, the remote 11 waits for the station to be idle for 2 seconds before clearing the call type and exiting the off-hook receive routine. The OFFHKR routine is branched to when the OFF-HOOK bit indicates the remote is off-hook. It also branches to the COINT and COINC routines to check for the depositing and counting of any coins. It calls the LISTEN routine to listen for coin tones. It calls the COLRET routine if money is to be collected for a call, or whether money should be returned to the caller. It relinquishes the line and shuts down any operating dtmf oscillator and LEDs, and returns control to the beginning of the MAIN polling loop.

Figure 14:
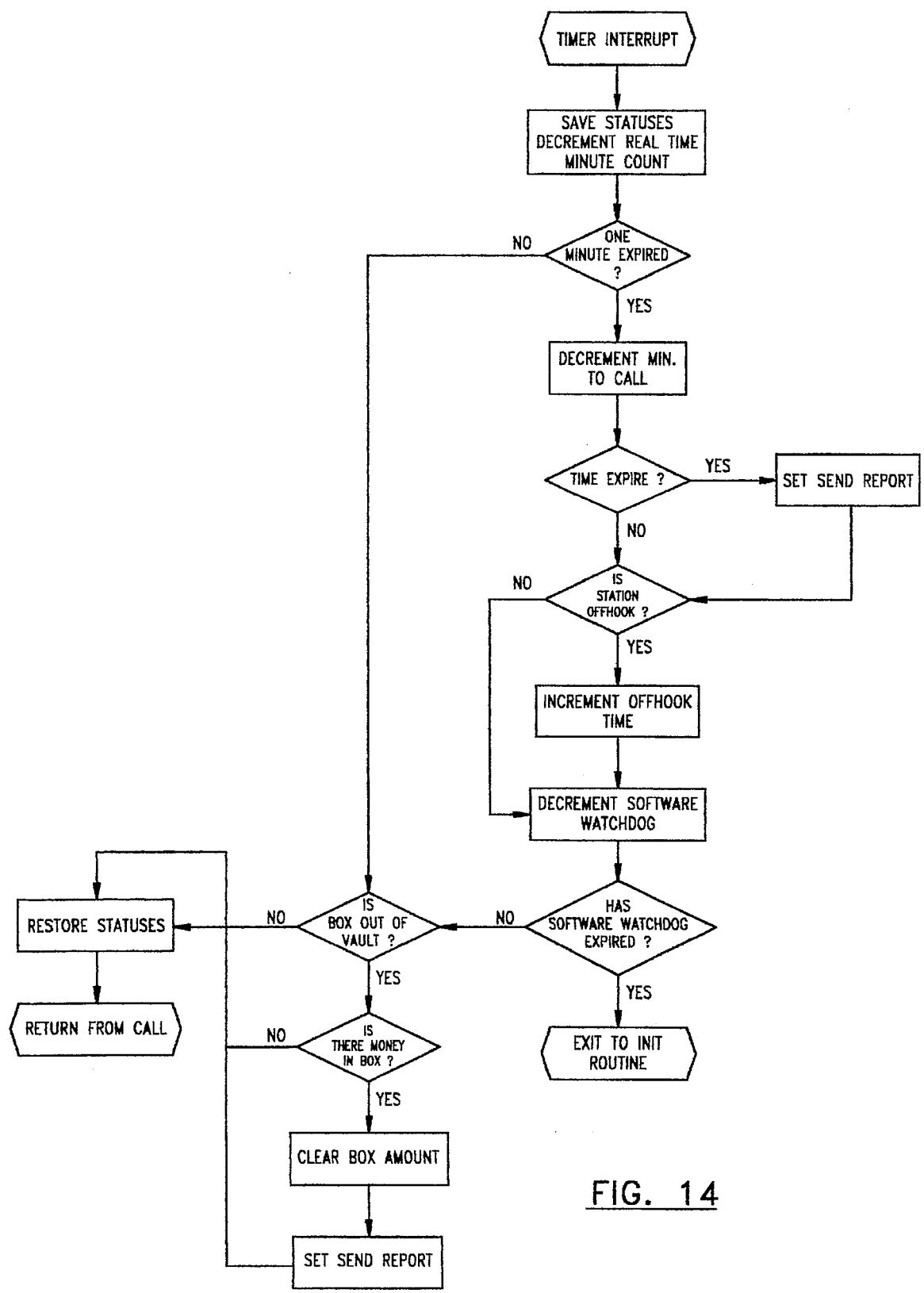
FIG. 14 is a flow diagram of an interrupt service routine of the remote unit software.

Referring to FIG. 14, the timer interrupt (TIMEINT) routine performs an interrupt service request which is a 20 msec. vectored timer interrupt. It keeps track of the elapsed time clock and polls for the off-hook signal going beyond a time out period, and if the coin box is out of its holder. It does not depend on a real time clock; instead it uses a real time counter created by the software and the IET0 interrupt every 20 msec. TIMEINT is performed automatically whenever IET0 restarts the program.

TIMEINT enables the system interrupt IET0 which, in turn, cancels any HALT instruction after 20 msec. and takes the microcomputer 41 out of the HALT mode and allows resumption of the program. This 20 msec. time out period allows for the polling of events in the MAIN polling loop and is an important step in conserving power as previously described. The TIMEINT provides a cadence method for storing an electric charge on the super capacitor 67 while stopping the software operation in order to poll important events.

The TIMEINT routine is the portion of the remote software that 1) tracks 20 ms. intervals as they pass counting to one minute, 2) each minute decrements the time to next call, 3) on the minute, if off-hook, adds to the off-hook time, and 4) checks whether the coin box is out of its vault.

The timer interrupt is called whenever the timer in the microcontroller overflows, every 20 ms. After saving the current status of the microcontroller, the minute counter is decremented. If there is no overflow, the next operation is to check the box-out switch on the pay phone. The status is restored and the control of the microcontroller is returned to the pre-interrupt setting. If the minute counter overflows, indicating one minute of elapsed time, the time to call is decremented. On reaching zero, the send_report flag is set. If the Station is off-hook, the off-hook time is incremented.

The box-out check is performed at the end of each instance of the timer interrupt. If the coin box is out of the vault, it is checked for validity (active for greater than 100 ms.) If valid, the coin box total is zeroed, the box-out report flag is set and the send_report flag is set.

In addition, TIMEINT and it submodules OFFINT, POW-INT and BOXINT also set flags (variables) looked for in the MAIN polling loop. They are interrupt service routine vectors which enable the system interrupts IET0, IE0, IE1 and IE4, which, in turn, function to set the 20 msec. timer and independently poll the off-hook switch OFF-HOOK, the power failure switch POW-FAIL, and the coin box out of the holder switch BOX-OUTS, respectively. OFFINT branches to the INIT3 routine to reset variable flags and restore the registers and memory banks to whatever existed before the HALT was performed. This provides a "rebooting" of the program and all of its current processing contents in order that the program can resume from wherever it was stopped.

Figure 15:
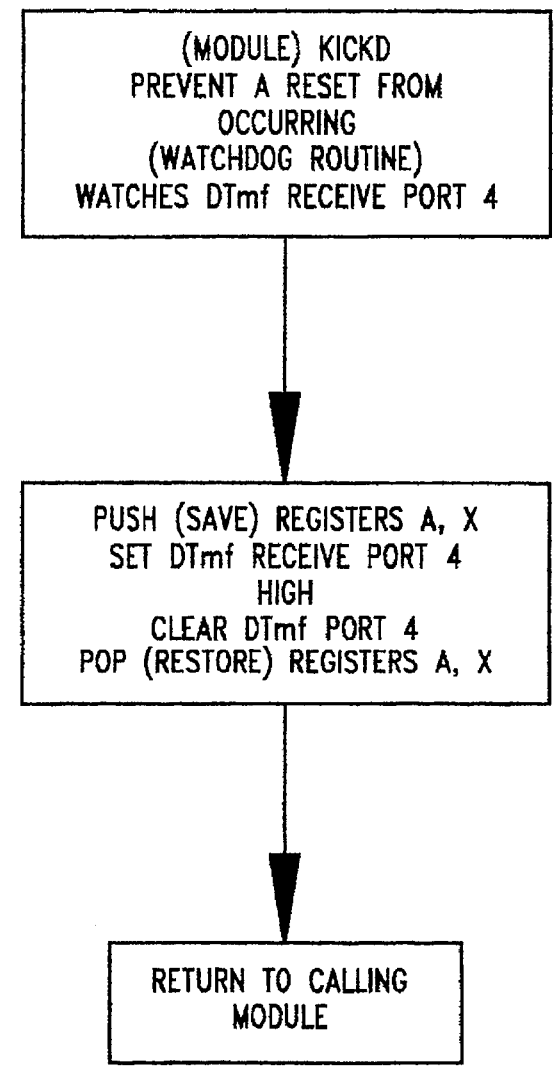
FIG. 15 is a flow diagram of program reset prevention routine of the remote unit software.

Referring to FIG. 15, the KICKD routine prevents a reset (such as described in the INIT routine) from occurring. It functions to stop the watchdog circuitry 116 by alternately sending a high bit of 0001B (B means binary number) and then a low bit of 1110B to the dtmf receiver 76 interface port 4 bit zero. This causes a pulse to be sent to the watchdog circuitry 116 which, in turn, prevents reinitialization of the microprocessor 41 software for approximately 1.2 seconds. This temporarily prevents an interruption of the current program operation.

Figure 16:
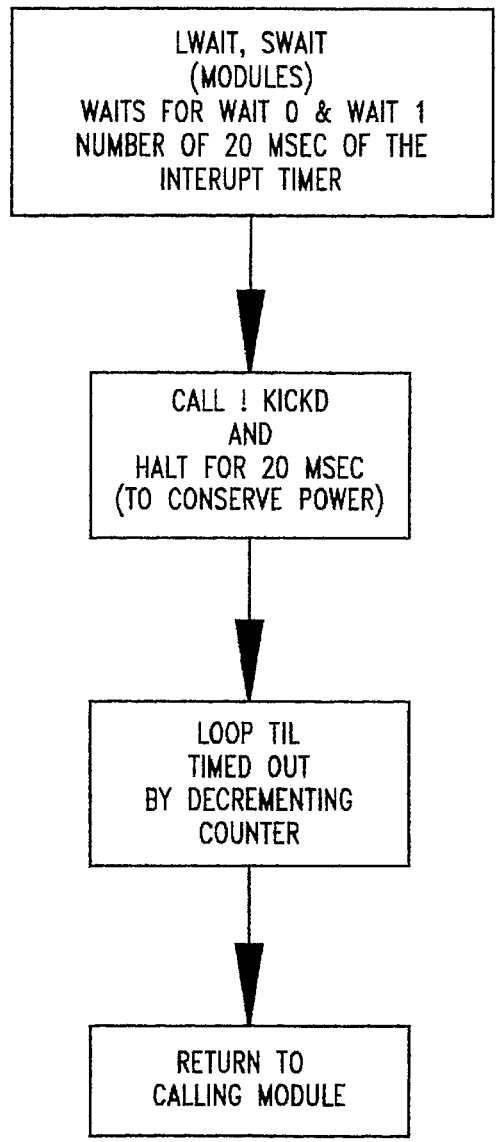
FIG. 16 is a flow diagram of a wait routine of the remote unit software.

Several WAIT (for specific periods of time) routines are called from other routines to time or temporarily stop program operations until the specified period of time has expired. The following describes the wait routines:

In FIG. 16, LWAIT and SWAIT wait for 1 or 2 (SWAIT and LWAIT respectively) counts of the 20 msec. interrupt timer TIMEINT by calling KICKD to prevent any reset and then performing a HALT instruction which automatically resumes operation from wherever it was called after 20 msec. For 2 waits, the above procedure is looped through a second time.

As shown in FIG. 17, DWAITX waits until the specified period of time in X is expired before resuming the software operations. X can be either 2, 4, 6, 10 or 16 msec. This timing routine is unlike LWAIT and SWAIT which depend on the HALT instruction for intervals of 20 msec. timing. Instead, DWAITX depends on a software clock and its basic interval timer, variable BTM, to determine when the X number of msec. has expired. When the time expires, the software operation continues from wherever it was called.

ZWAITA waits for A seconds, using the LWAIT routine for each 1 second period as described in FIG. 18.

In FIG. 19, LPWAIT waits for A seconds, where A is 1, 2, 3, 4 or 5. It is designed to timeout for the specified A seconds. If no timeout occurs during the processing of events in the loop of instructions which it is timing (in the called from routine), then it returns to the where it was called; however, if LPWAIT does timeout, it returns control to the called from routine and skips the next instruction there. LPWAIT is called from the LEARN and RINGIN routines. In LEARN, it times the off-hook condition, and in RINGIN, it times the number of rings of the remote phone.

Figure 28:
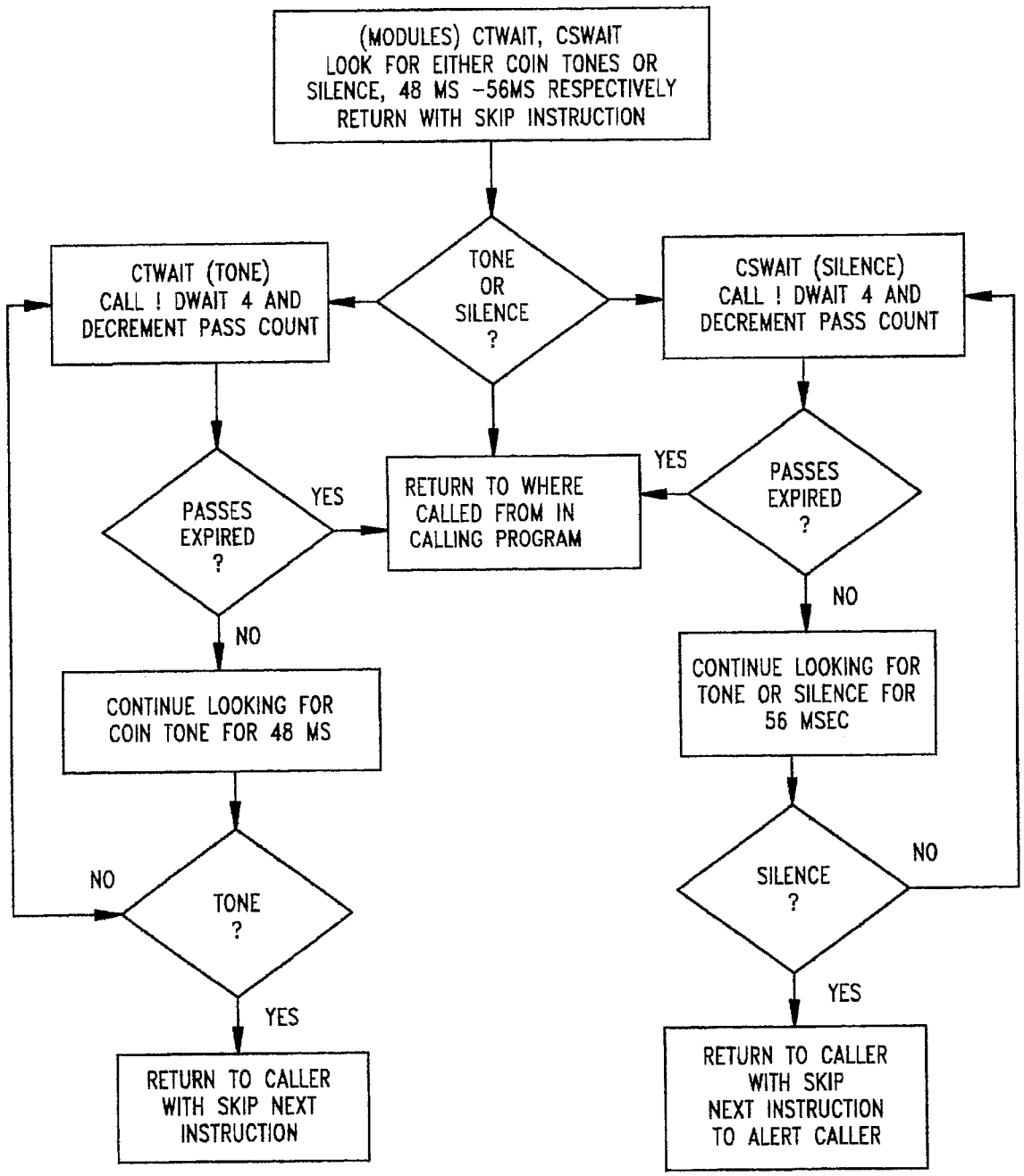
FIG. 28 is a flow diagram showing coin tone wait routines of the remote unit software.

The coin tone waiting routines CTWAIT and CSWAIT as shown in FIG. 28 are called from the COINC coin counting routine. CTWAIT calls DTWAIT4 for 4 msec. waits, then it checks the variable R-TONE on Port 2 for an indication that a tone is present. If not, it repeats itself for up to 48 msec. If it does not find a tone, it returns to where it was called from, but if it does find a tone, it returns to the calling program and skips the next instruction there. Similarly, the CSWAIT routine checks R-TONE at 4 msec. intervals for up to a total of 56 msec. and returns to the calling program with or without a skip instruction depending on whether or not it finds a tone, respectively.

The following routines perform specific functions:

Referring to FIG. 20, SETRY sets the report call retry timer variable CALTMO to three minutes.

Figure 21:
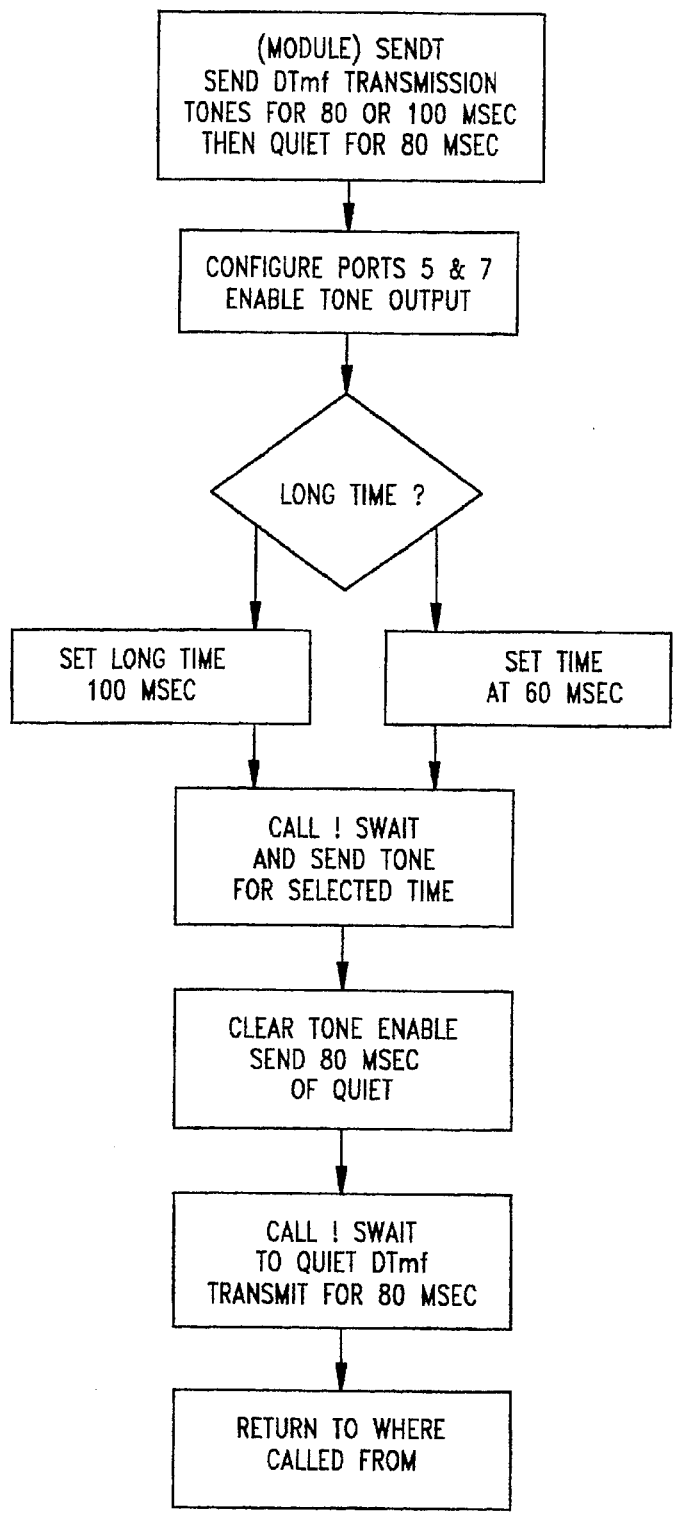
FIG. 21 is a flow diagram of a send tone routine of the remote unit software.

As shown in FIG. 21, the SENDT routine sends dtmf tones to the host for 80 or 100 msec. as indicated by bit LTONE in the variable Status 0, then it forces a quiet for 80 msec. It sends the tones out to the dtmf transmitter 95 along port 7. The tones represent the reports sent to the host in packets of 4 nibbles each, each nibble has 4 bits of data.

Figure 22:
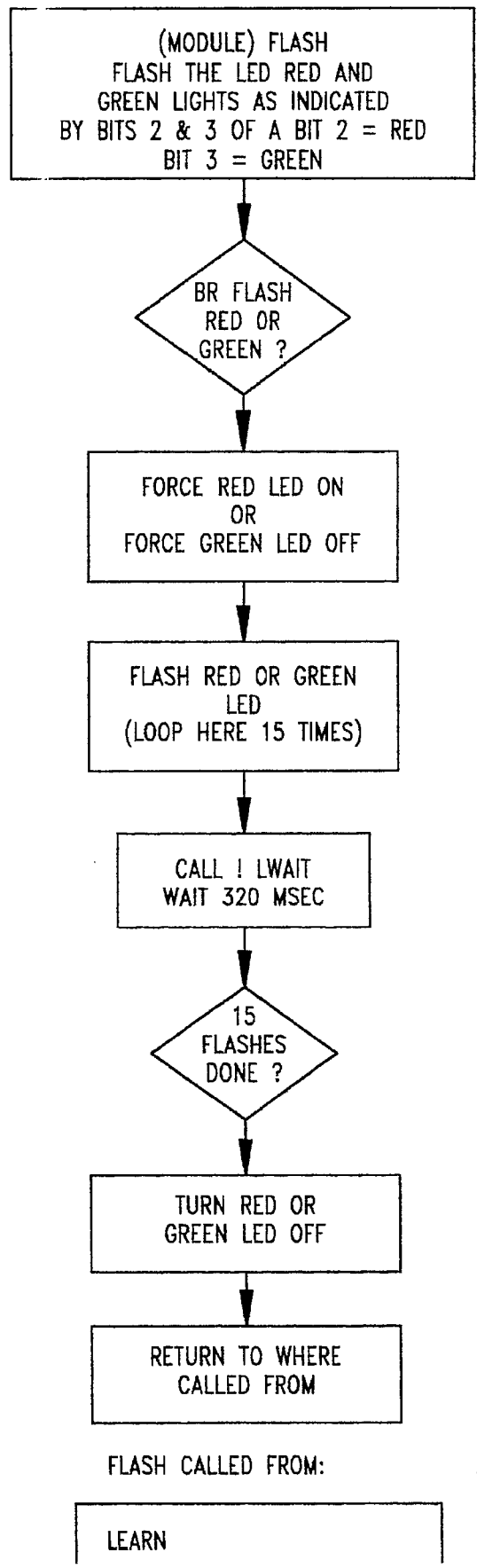
FIG. 22 is a flow diagram of a flash the red and green light emitting diodes routine of the remote unit software.

The FLASH routine as described in FIG. 22 flashes either the red or green LEDs or both of them 8 times as a notification to a technician concerning the activity of the remote.

Figure 23:
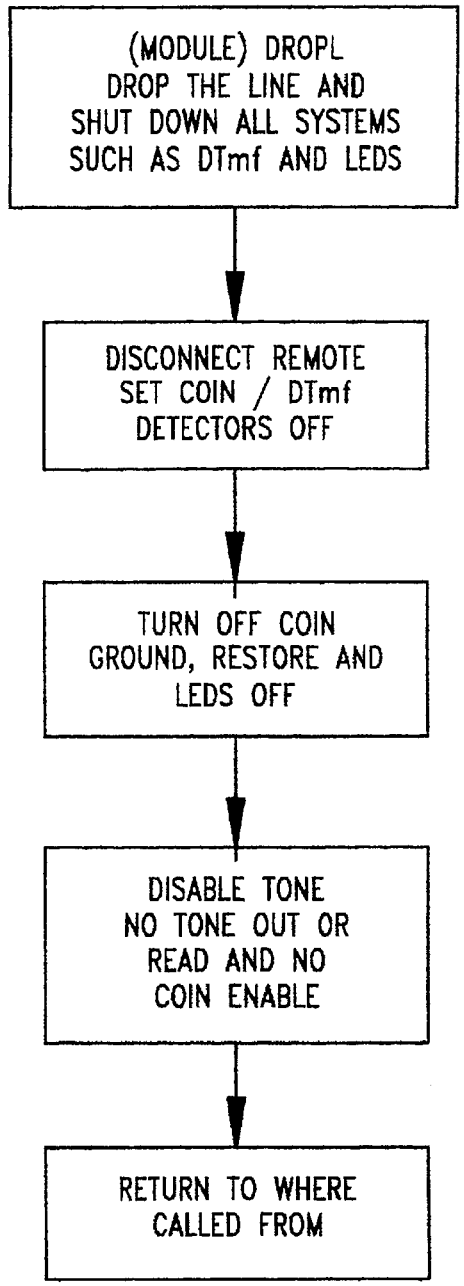
FIG. 23 is a flow diagram of return the dial tone to the phone user routine of the remote unit software.

In FIG. 23, the DROPL routine turns off any operating dtmf and coin oscillators and LEDs and allows a customer to use the remote phone.

The INRHL, INRH, DECHL and DECH routines as shown in FIG. 24 increment or decrement the H and L registers by one in order to count various events in other routines.

In FIG. 24, the INCX routine increments a memory address either 2 or 5 positions according to the value of X.

Figure 25:
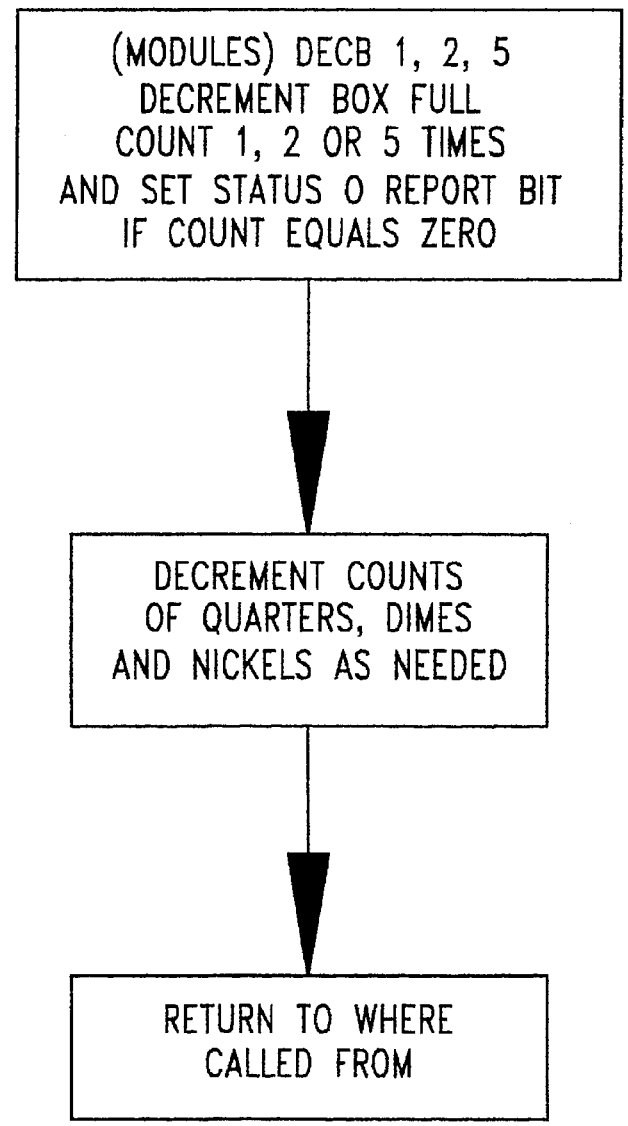
FIG. 25 is a flow diagram showing a coin box counter routine of the remote unit software.

The DECB1, 2, 5 routine as shown in FIG. 25 decrements the box full variables FULL0, FULL1, FULL2 and FULL3 by 1, 2 or 5 times. If the count becomes zero, it sets the report bit BOXF in Unit Status 1 and bit SRPT in Status 0, to warn the MAIN polling loop that it is time to send a report to the host that the coin box is full and needs to be collected by a phone service technician.

Figure 26:
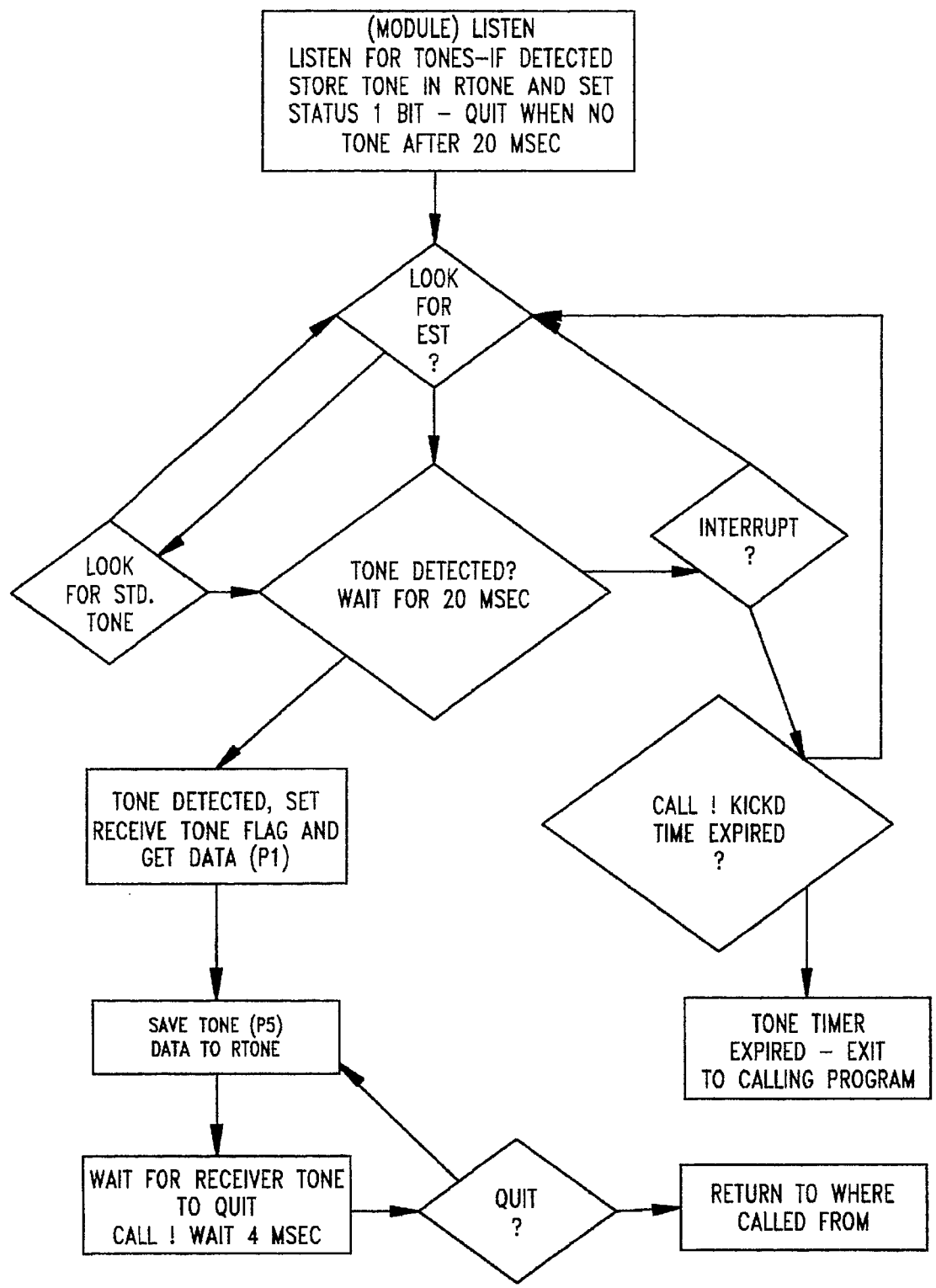
FIG. 26 is a flow diagram of a tone listen routine of the remote unit software.

In FIG. 26, the LISTEN routine listens for tones (from any source such as the host, coin detector, off-hook condition) by polling the EST-SW on port 2 bit 1. If EST-SW bit i is set, it signifies that a tone is present, and R-TONE on port 2 bit 0 is inspected for the actual tone. However, if neither EST-SW or R-TONE indicates a tone, LISTEN waits up to 20 msec. for an EST-SW, and if it detects a tone, it waits another 20 msec. in order to detect it in R-TONE. If no tones are detected, LISTEN returns to wherever it was called from (such as the DTMFWT, LEARN, OFFHKR or COINC routine). However, if R-TONE bit 0 is set to 1, a tone is detected, then LISTEN sets a receive tone flag, READT, and sends it to the receiver along port 7, which allows the receiver to send the tone data information along port 5 into the buffer in register A of memory bank MBE15.

Figure 27:
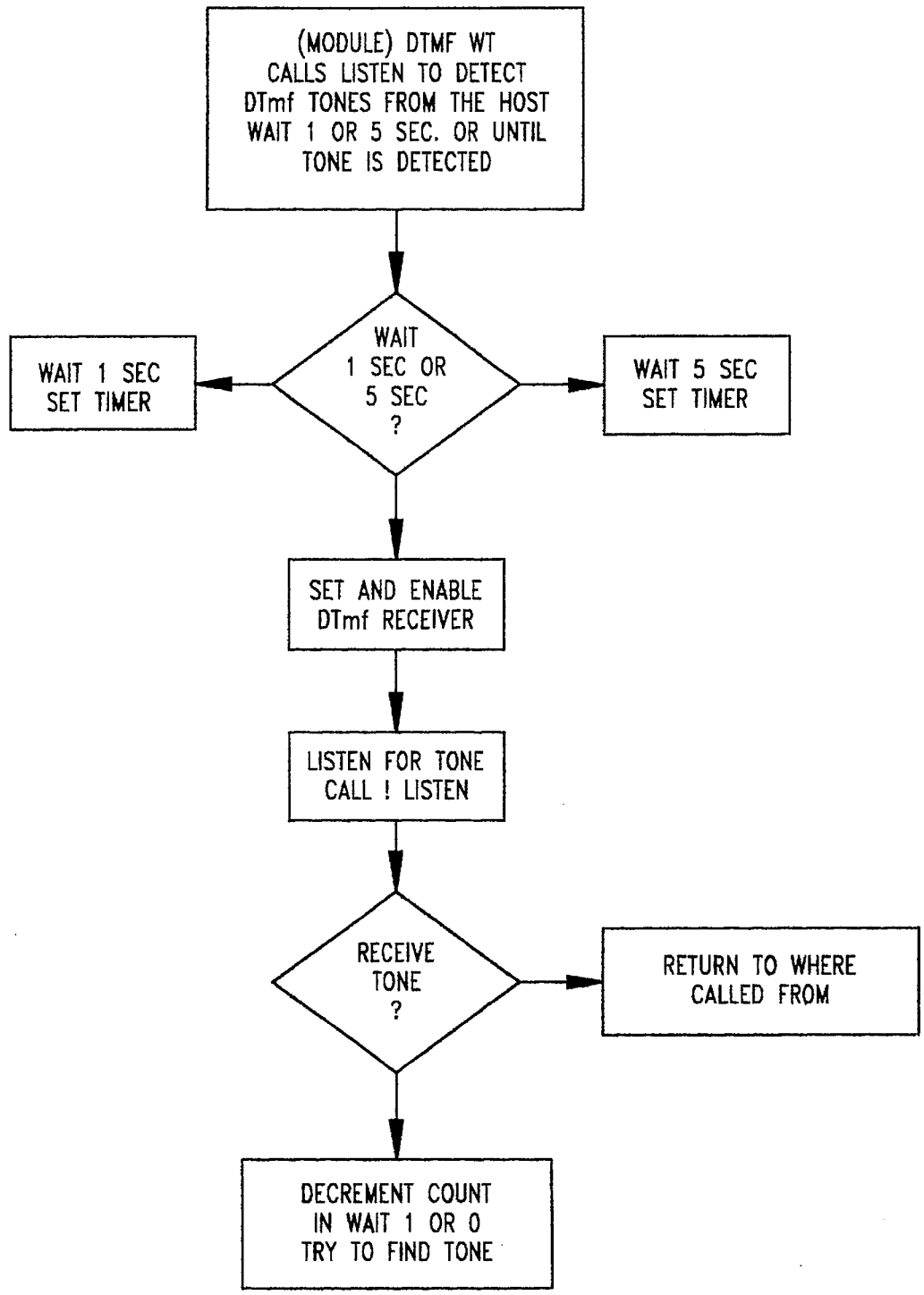
FIG. 27 is a flow diagram of a dual-tone multifrequency signal detection routine of the remote unit software.

The DTMFWT routine shown in FIG. 27 sets up a 5 second timeout during which it calls the LISTEN routine in order to detect dtmf tones representing commands and data from the host.

Figure 29:
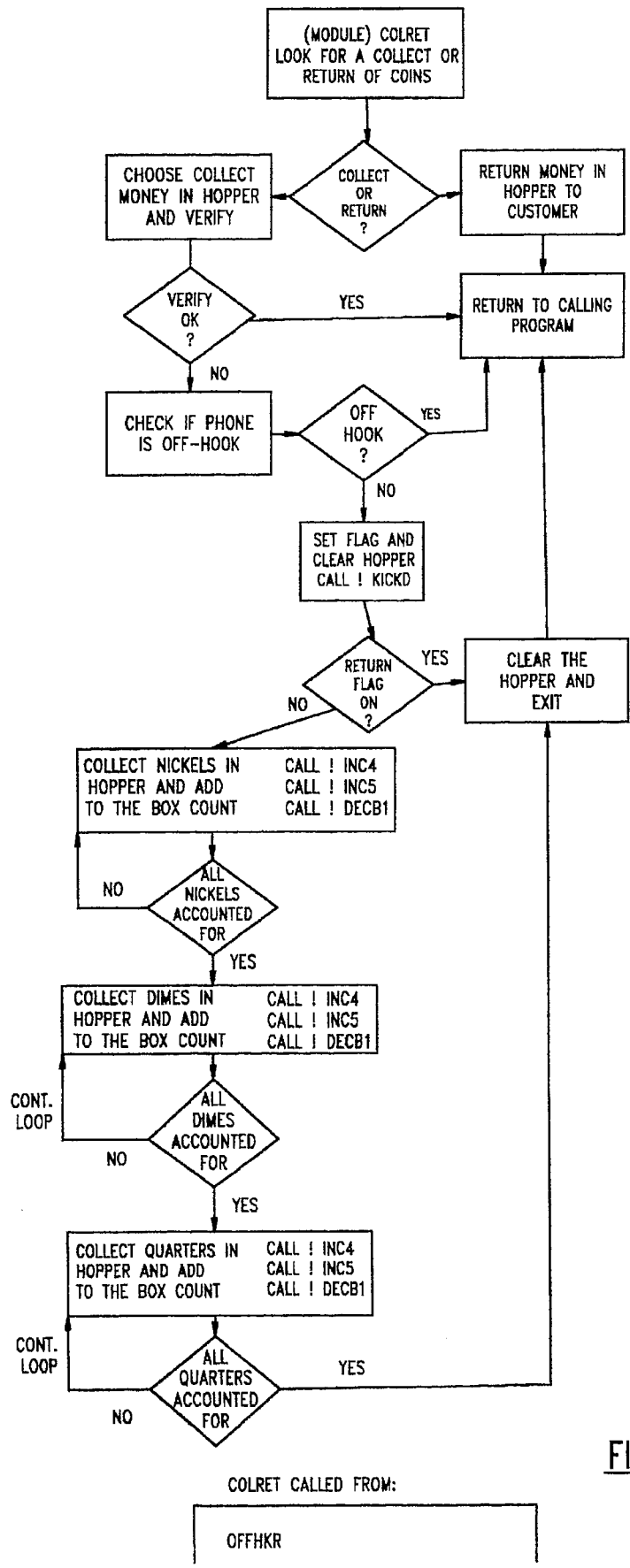
FIG. 29 is a flow diagram showing coin collect or return routine of the remote unit software.

Referring to FIG. 29, the COLRET routine checks whether coins in the hopper are to be collected or if they were returned. If the variable COLLECT bit 2 on port 1 is zero, COLRET verifies the coins were collected and adds the nickels, dimes and quarters and updates the box full counts by calling DECB1, 2 and 5. If the COLLECT bit is not set, the variable RTRN-SW is inspected to determine if there is money in the coin hopper, or if it was returned to the customer. If neither a collect or a return of money is indicated or if the remote is off-hook, COLRET just returns to the OFFHKR routine where it was called from.

Figure 30:
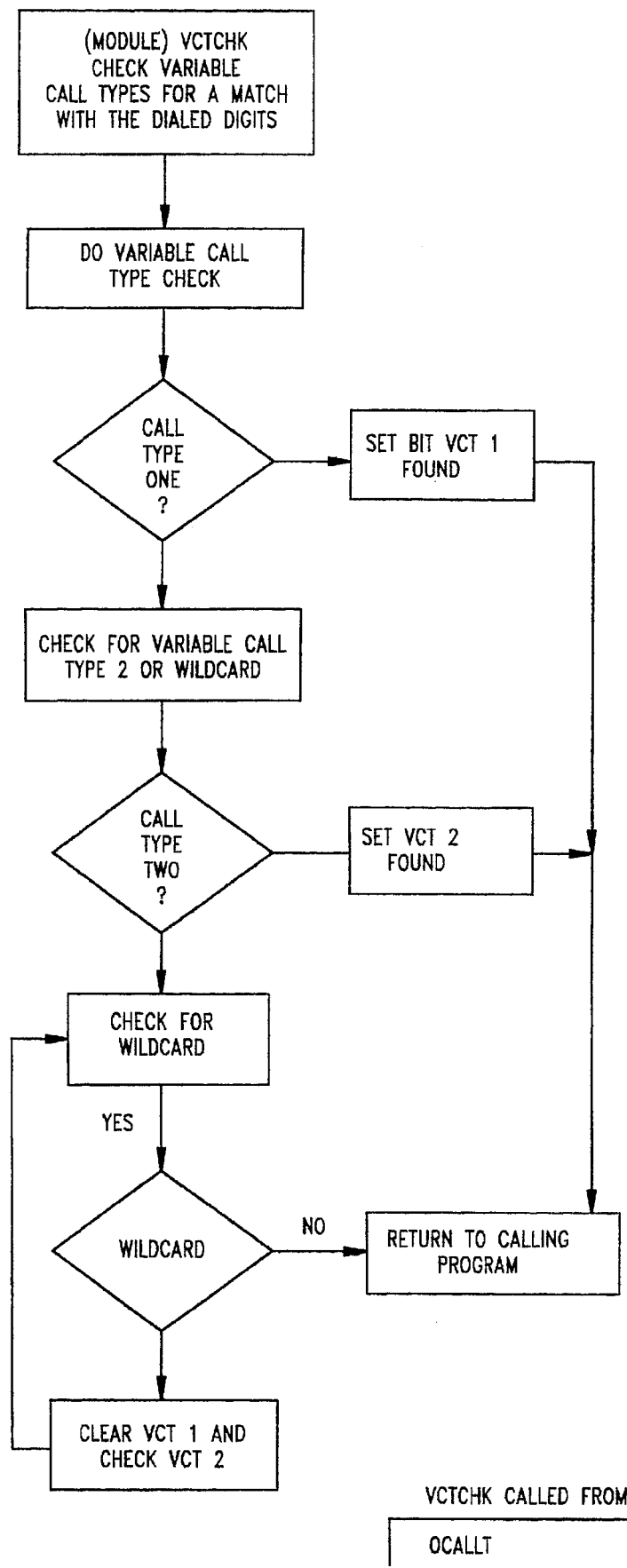
FIG. 30 is a flow diagram of a variable call type routine of the remote unit software.

In FIG. 30, the VCTCHK routine checks the variable user call types for a match with the digits dialed from the remote. It inspects bits 0 and 1 of variable VCTSTA to check if the call is type 1 or 2 or a wildcard type (user defined calls). VCTCHK is called by the DCALLT routine which decodes call types according to the digits pressed on the keypad at the remote, or according to the dtmf tones representing the digits dialed.

Figure 31:
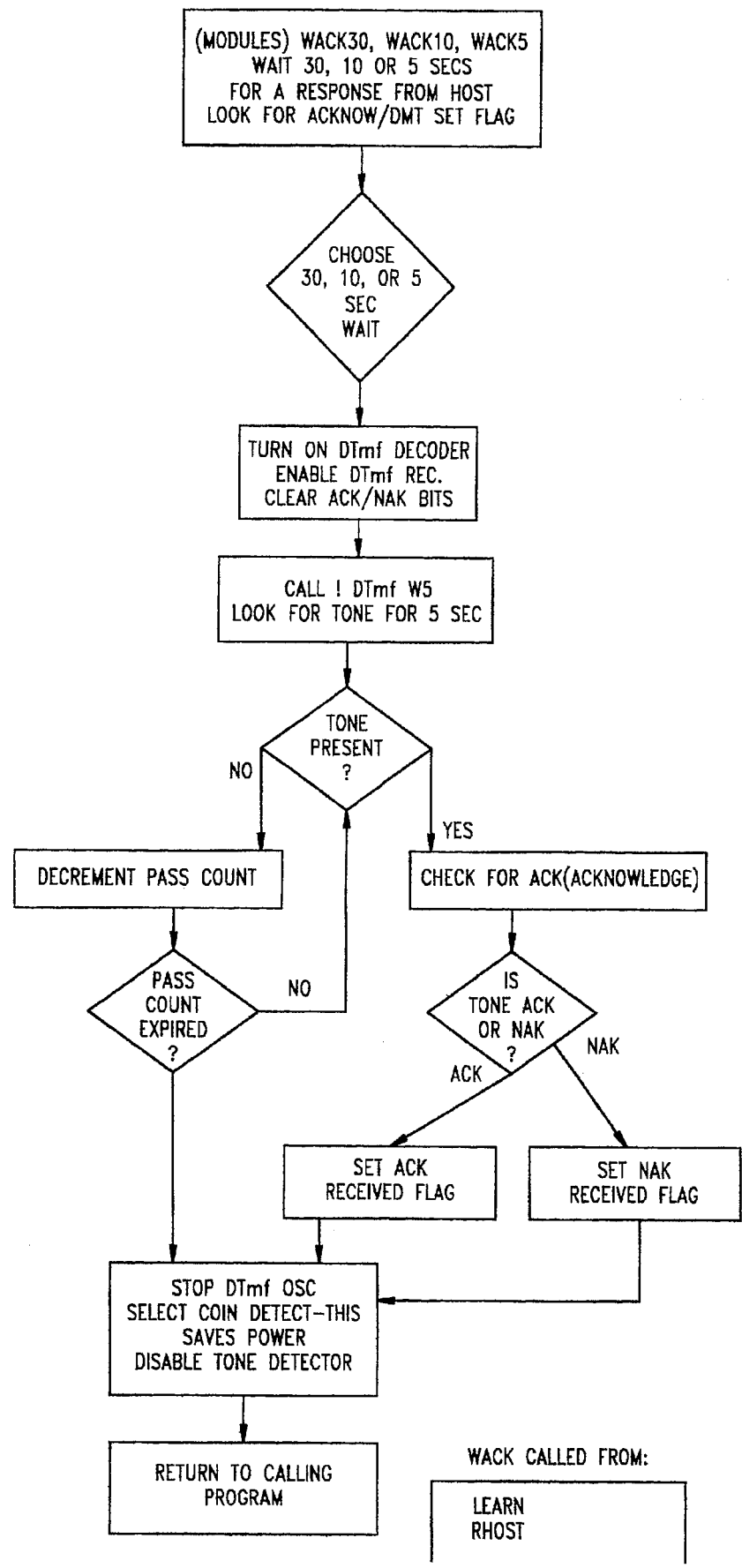
FIG. 31 is a flow diagram showing host communication acknowledgment routines of the remote unit software.

The WACK30, WACK10 and WACK5 routines as shown in FIG. 31 wait 5, 10 or 30 seconds to receive an acknowledgment tone of either ACK or NACK from the host computer. It turns on the dtmf oscillator 91 DTMF-OS on port 4, and enables the dtmf receiver 76. After the specified wait time, it calls DTMFW5 looking for a tone in 5 second intervals. It compares any tone received with the ACK and NACK constants and if it finds a match, it sets either the ACKR (acknowledged) or NAKR (not acknowledged) flags. Then, it turns off the dtmf oscillator and turns on the coin oscillator COIN-OS detector, (this saves power and ensures that the remote program doesn't fail to receive a coin deposit signal), and disables the dtmf tone detector and returns to where it was called from in either the LEARN or RHOST routines.

Figure 32A:
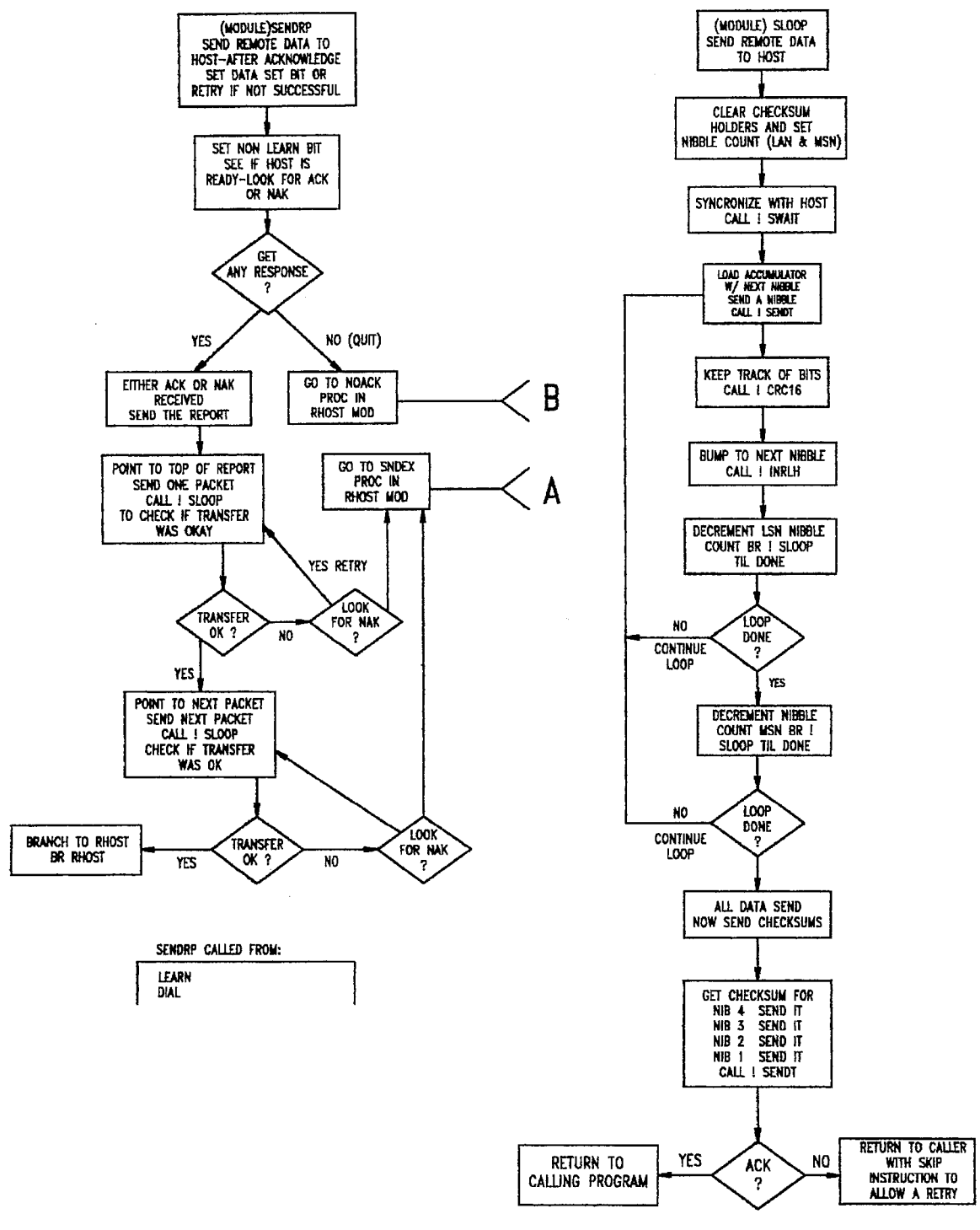
FIG. 32 is a flow diagram showing send report data to the host routines of the remote unit software.
Figure 32B:
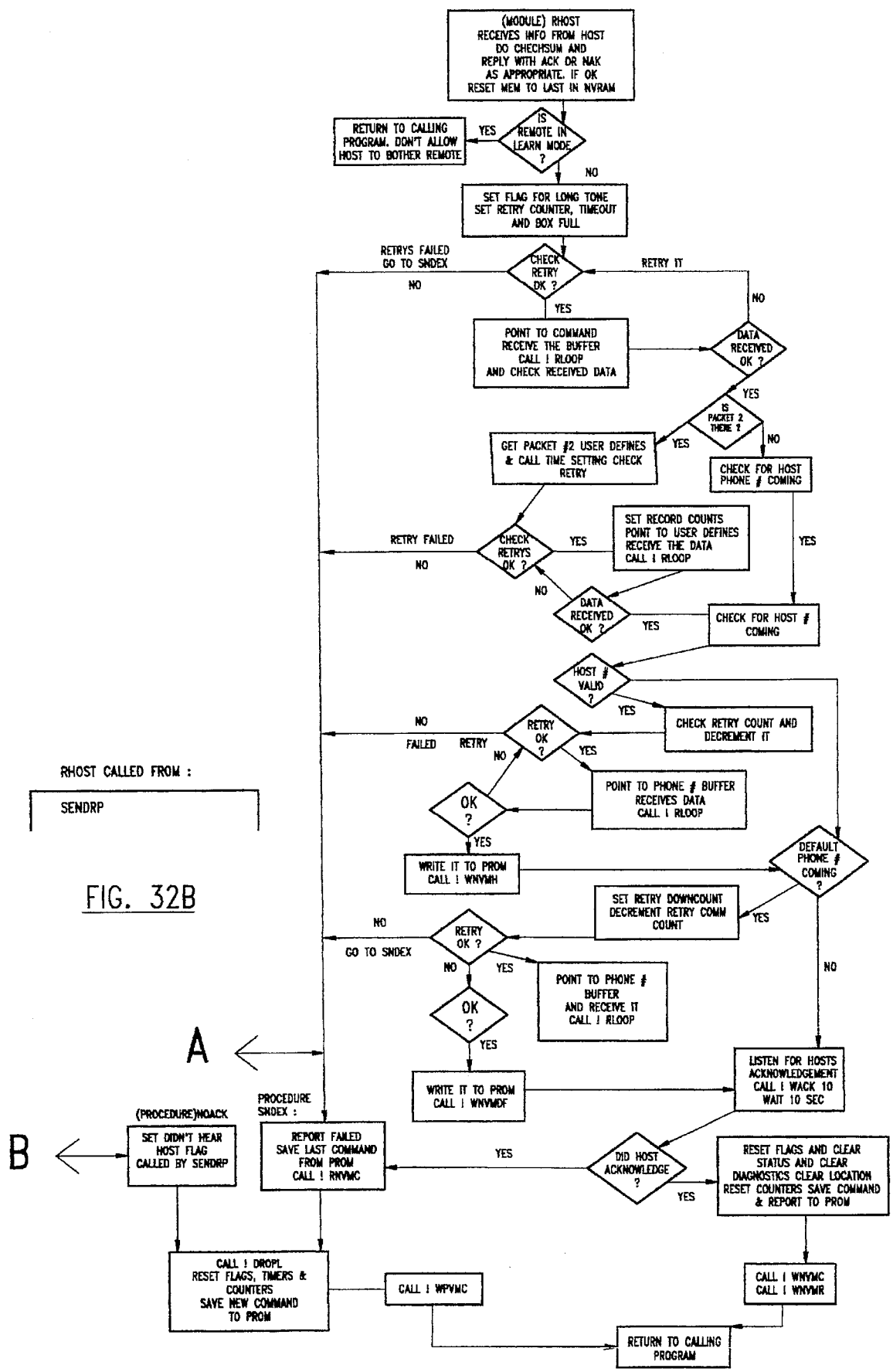

The SENDRP routine shown in FIG. 32 is the first in a sequence of communications with the host used for transferring two data packets via dtmf tones. It clears the LRNM mode bit in order that the learn request LEARN-SW will not interfere with it. The SENDRP calls WACK30 to wait for up to 30 seconds for the host to respond with an acknowledgment ACKR bit that it is ready to receive data from the remote. If yes, SENDRP points to the beginning of the first data packet to be sent and calls the SLOOP routine to transfer it. If the transfer is okay, it sends the second data packet. After the second packet is sent, it branches to the RHOST routine to await acknowledgment that the transfer was okay, and to save the report and its command to the remote's nonvolatile memory (EEPROM) 125. SENDRP will keep retrying to send the data as long as it receives a NAKR from the host. However, if it fails, it restores the last command and sets the report failed flag RPTF in order to retry sending the report packets at a later time. SENDRP only fails when the host fails to respond with a communication setting either bits ACKR or NAKR. When finished, SENDRP returns to where it was called from in either the LEARN or DIAL routines.

Also shown in FIG. 32, the SLOOP routine gets report data and checksums ready to send to the host. It calls SWAIT to synchronize data transmission with the host, it calls the SENDT routine to send the data and checksums, and it calls CRC16 to keep track of the checksums for each nibble of data sent. After sending is completed, it looks for an acknowledgment from the host, by inspecting the ACKR variable. If successful, it returns to where it was called from in SENDRP. Otherwise, it returns with a skip instruction in order to retry sending the report.

The RHOST routine as shown in FIG. 32 monitors the information (data, flags and commands) received from the host and causes it to be written to the nonvolatile memory (EEPROM) 125. RHOST calls RLOOP to verify the checksums of each nibble received and to send either a NACK or an ACK back to the host as appropriate. RHOST calls WACK10 to determine when the host is finished sending data. If the report from the host fails, RHOST sets flag SRPT and returns to either the DIAL or LEARN program that called the SENDRP routine in order to retry receiving it at a later time. Otherwise, RHOST calls the WNVMC and WNVMR modules in the WNVMEM routine to write the data and commands successfully received from the host to the nonvolatile memory (EEPROM) 125. When finished, RHOST returns to where it was called from and eventually to the beginning of the MAIN polling loop.

Figure 33:
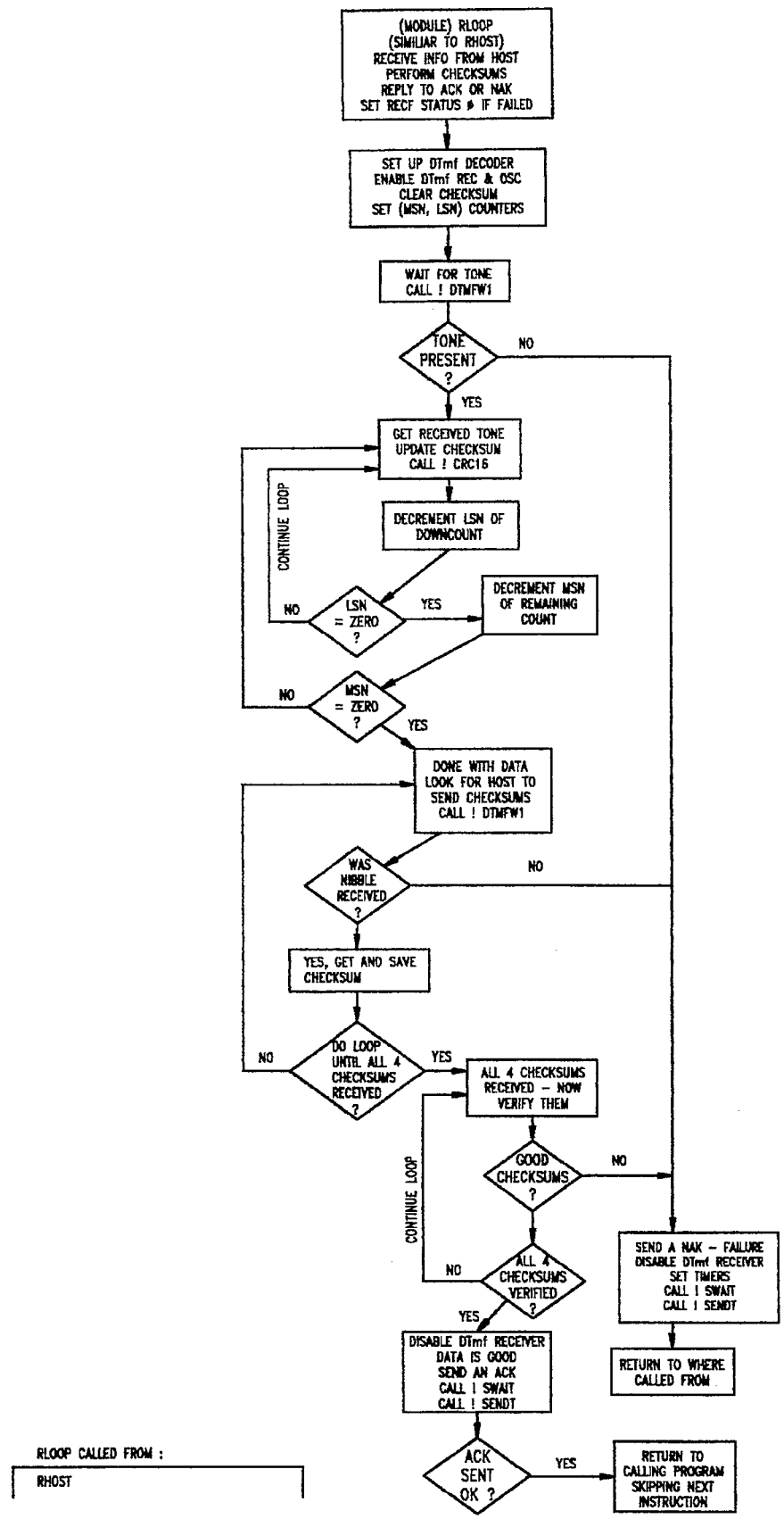
FIG. 33 is a flow diagram showing a receive information from the host routine of the remote unit software.

In FIG. 33, the RLOOP routine is called from RHOST as described previously to receive the information transmitted from the host, and to verify that the checksums for each nibble of data correspond to the checksums computed by the CRC16 routine. RLOOP also notifies the host if the received data is verified by calling SENDT to send either an ACK (acknowledged) or NAK (not acknowledged). RLOOP enables the DTMF-OS decoder and the dtmf receiver on port 4. It calls the DTMFW1 routine to wait for a tone, and stores the data received, while calling the CRC16 routine to update checksums on the data received, nibble by nibble. It loops through the software instruction code for receiving data until all report nibbles are received, and then waits for the host to send its independent computation of the nibble checksums. When all checksums have been received and verified with the checksums computed by the CRC16 routine, the data transmission is successful and an ACK is sent to the host. If not successful, a NAK is sent. In either event, the dtmf receiver is disabled, and the program returns to where it was called from in RHOST.

Figure 34:
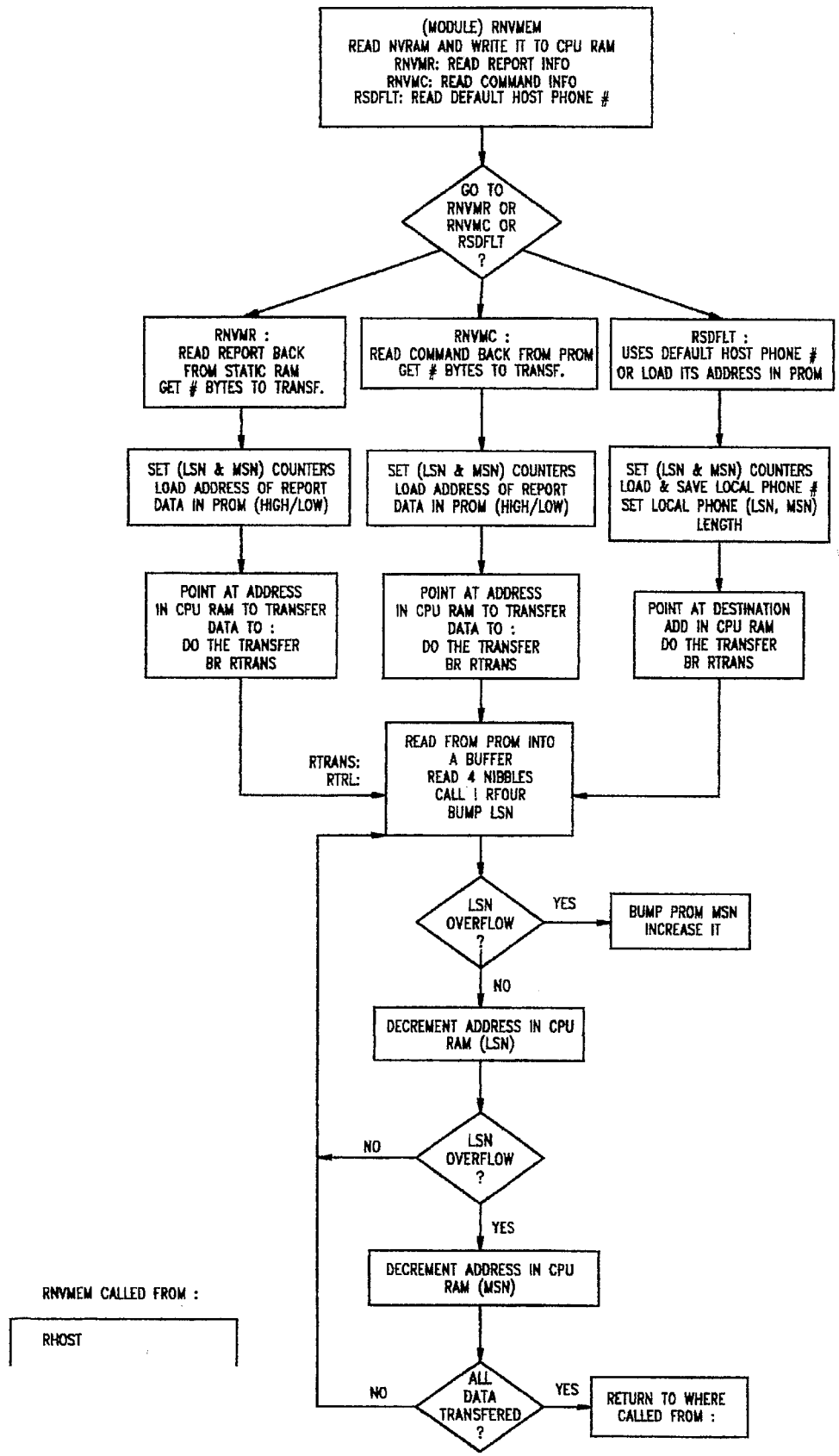
FIG. 34 is a flow diagram showing write data from the nonvolatile memory to the remote central processing unit routines of the remote unit software.

The RNVMEM routine as shown in FIG. 34 reads information in the nonvolatile memory (EEPROM) 125 and writes it to a buffer area of the CPU memory. Depending on information specified by the calling routine, one of the following procedures (subroutines) is performed:

RNVMR—read report data—called from LEARN;

RNVMC—read command information 13 called from LEARN or RHOST;

RSDFLT—restore the default host phone number—called from DIAL; and

RSNUM—read the host phone number from nonvolatile memory (EEPROM) 125—called from DIAL.

Figure 35:
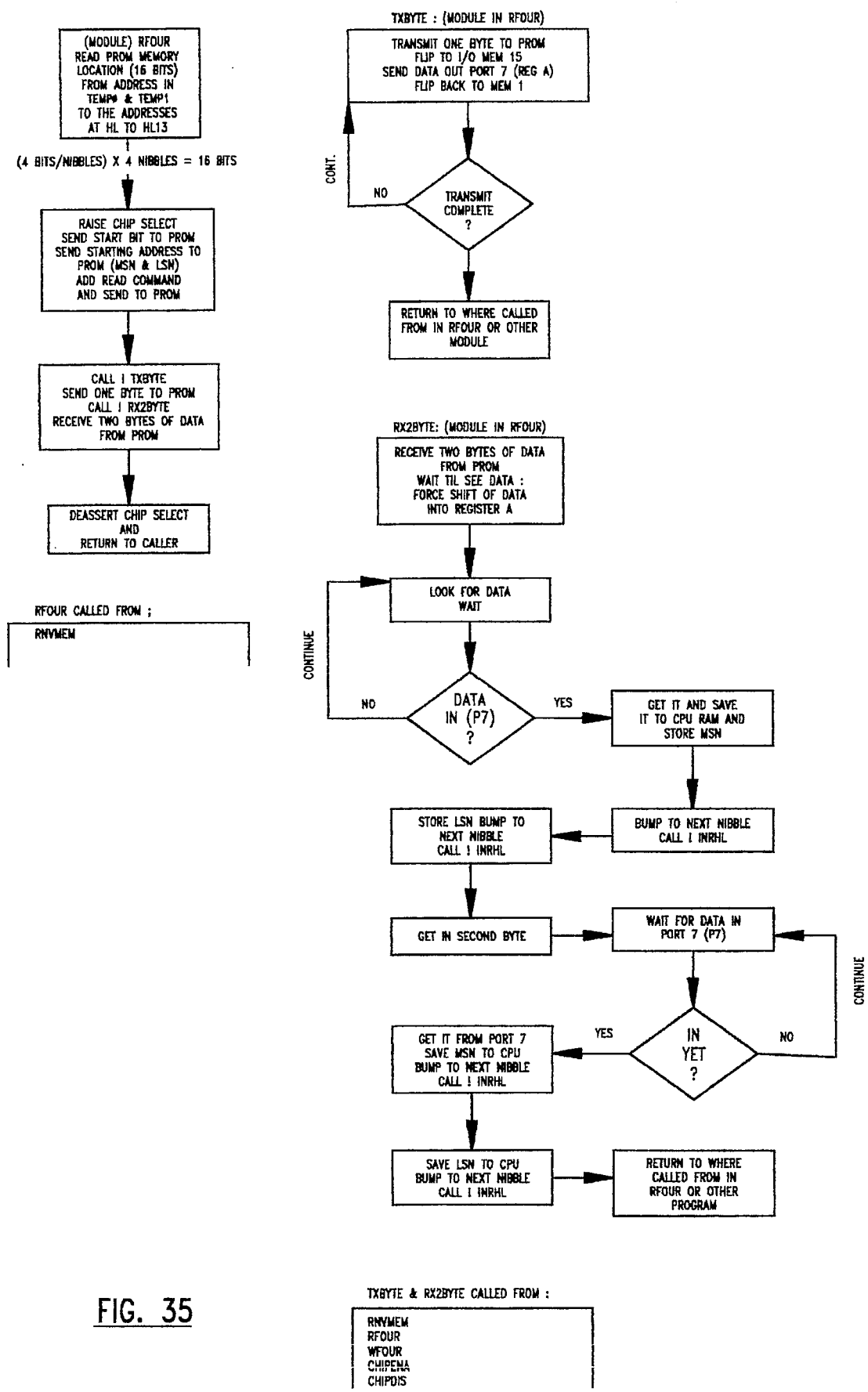
FIG. 35 is a flow diagram showing a read and write data from the nonvolatile memory to the remote central processing unit and vice versa routines of the remote unit software.

The RFOUR routine shown in FIG. 35 reads and stores information from the EEPROM to the CPU and vice versa by selecting the I/O memory bank to send and receive data through the serial port S10, and selecting the CPU RAM memory bank to obtain or store the data in the CPU registers. RFOUR calls the subroutine TXBYTE to send the starting and ending nibble addresses of the data specified to the nonvolatile memory (EEPROM) 125. Then, RFOUR calls the subroutine RX2BYTE to receive the specified data from the nonvolatile memory (EEPROM) and store it in the CPU RAM register pair HL.

Figure 36:
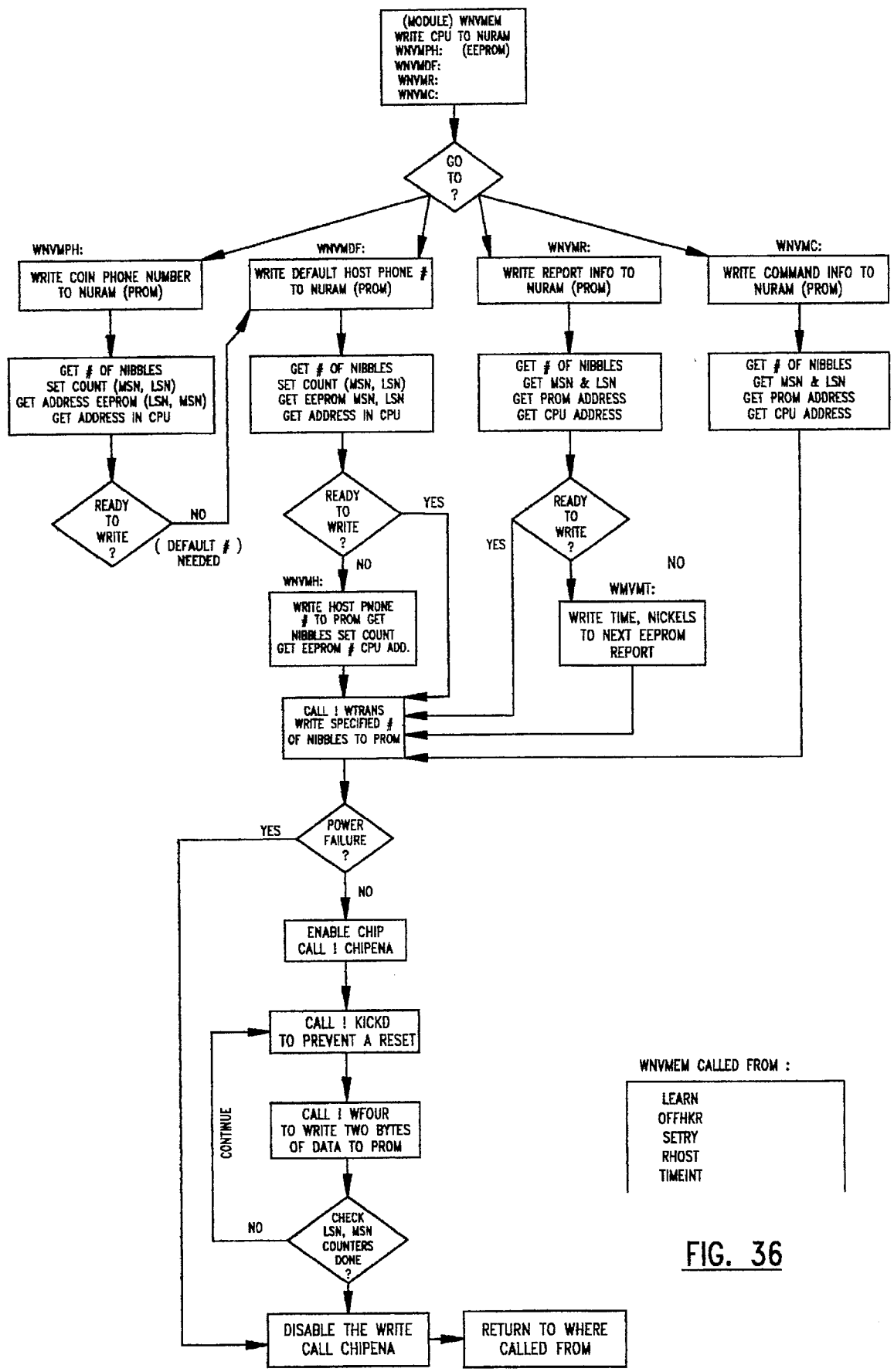
FIG. 36 is a flow diagram showing write data from the remote central processing unit to the nonvolatile memory routines of the remote unit software.

Shown in FIG. 36, the WNVMEM routine is similar to the RNVMEM except it writes CPU memory to the nonvolatile memory (EEPROM) 125. Depending on the data specified, the following subroutines are called:

WNVMPH—write the coin phone number;

WNVMDF—write the default host phone number;

WNVMR—write the report information;

WNVMC—write the command information; and

WNVMT—write the time and nickels for next report to the host.

The subroutines locate the starting and ending addresses of the data in the CPU RAM to be sent to the nonvolatile memory (EEPROM) 125, and also locate the beginning address in the EEPROM where it is to be written. Then the WTRANS subroutine is called to do the actual writing to the nonvolatile memory (EEPROM) 125. To do so, WTRANS enables the nonvolatile EEPROM chip 125 by sending out a CS-HIGH and an ENA-W command signal on port 7 and then calling WFOUR and TXBYTE (as described in RFOUR) to send the specified data. When finished, the nonvolatile memory (EEPROM) 125 chip is disabled by calling the CHIPDIS subroutine which sends a disable command DIS-W to the EEPROM and de-asserts it by sending the flag NOTCS out on port 7. When finished, all of the subroutines in WNVMEM return to where they were called from in LEARN, OFFHKR, SETRY, RHOST or TIMEINT.

Figure 37:
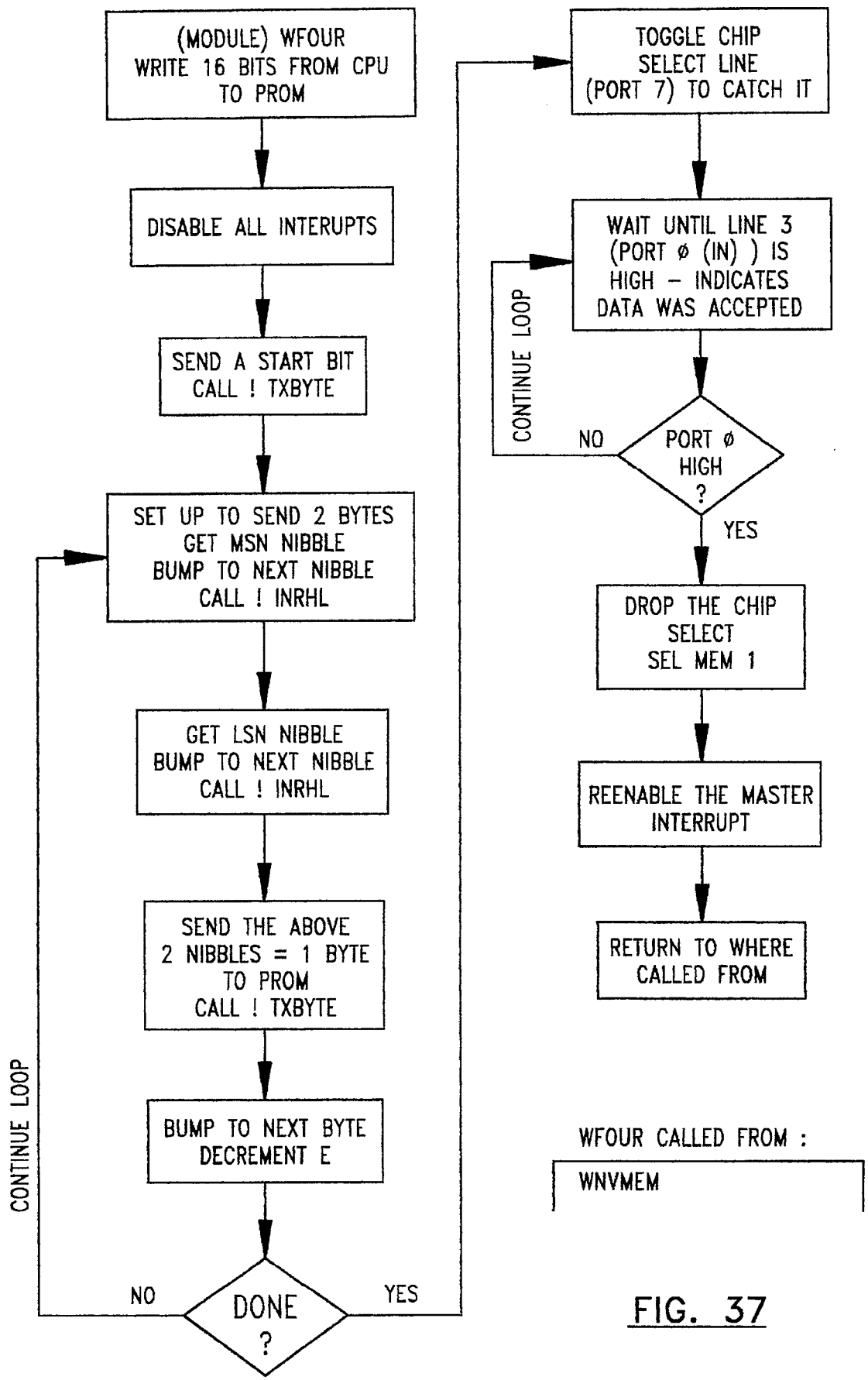
FIG. 37 is a flow diagram showing write 16 bits of data from the remote central processing unit to the nonvolatile memory routines of the remote unit software.

The WFOUR routine shown in FIG. 37 causes two bytes (two bytes=4 nibbles=16 bits) to be written from the CPU to the EEPROM. WFOUR calls TXBYTE to write one byte (two nibbles) at a time and then verifies the data bytes were accepted by the nonvolatile memory (EEPROM) 125. WFOUR includes subroutines shown in FIG. 38, which are CHIPENA which enables the nonvolatile memory 125 to accept data, and the subroutine CHIPDIS which disables it. WFOUR is called from one of the write subroutines in WNVMEM to where it returns when it is finished.

Figure 39:
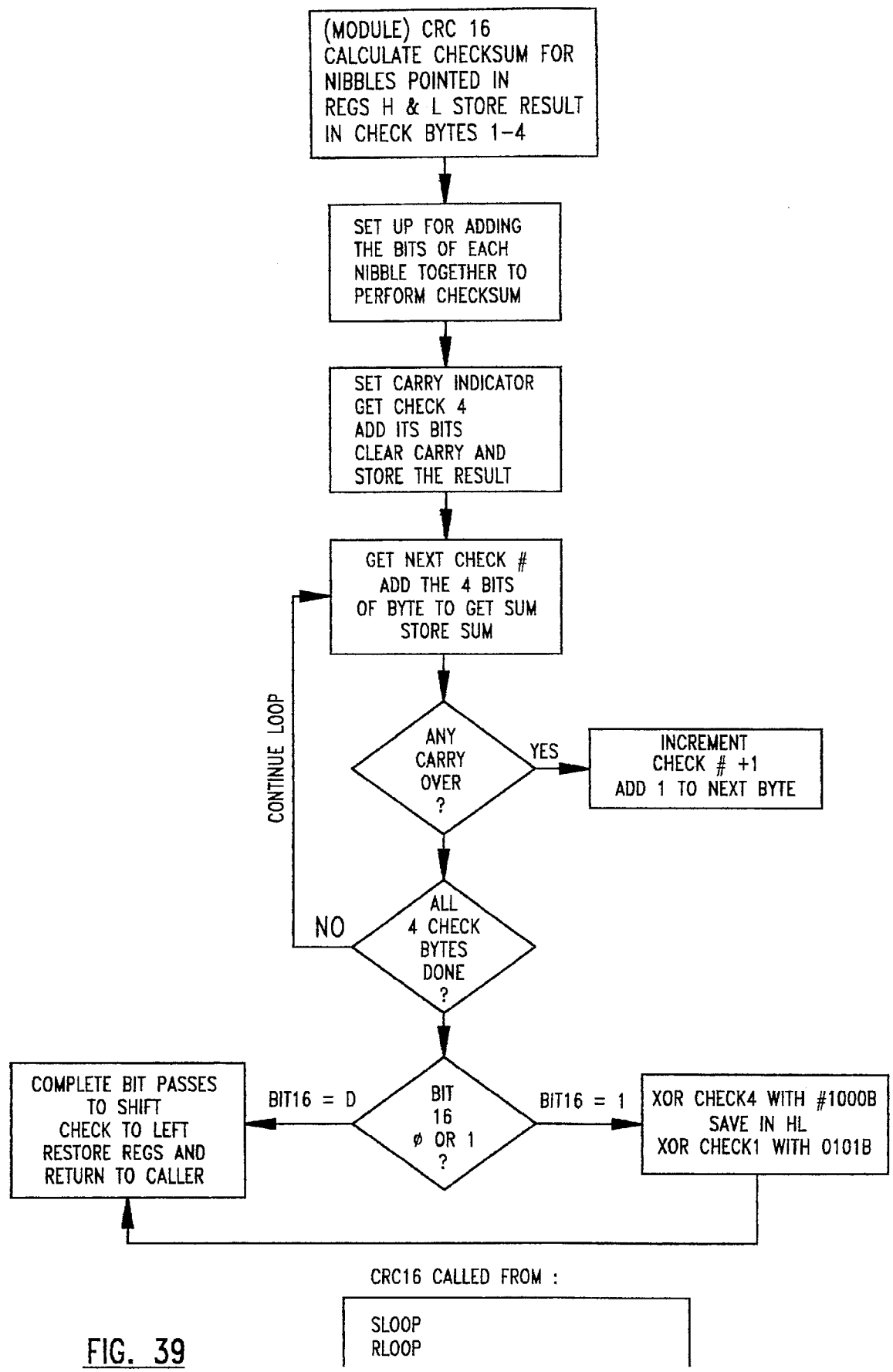
FIG. 39 is a flow diagram of the checksum routines of the remote unit software.

Referring to FIG. 39, the CRC16 routine calculates the checksum for each nibble in the data specified by register pair HL. The results are stored in CHECK1, CHECK2, CHECK3 and CHECK4 representing the sum of the four bits of each nibble, respectively. This routine is called by the SLOOP and RLOOP routines to verify that information sent to the host or received by the remote is correct and matches the corresponding checksums computed independently by the other computer.

Figure 40:
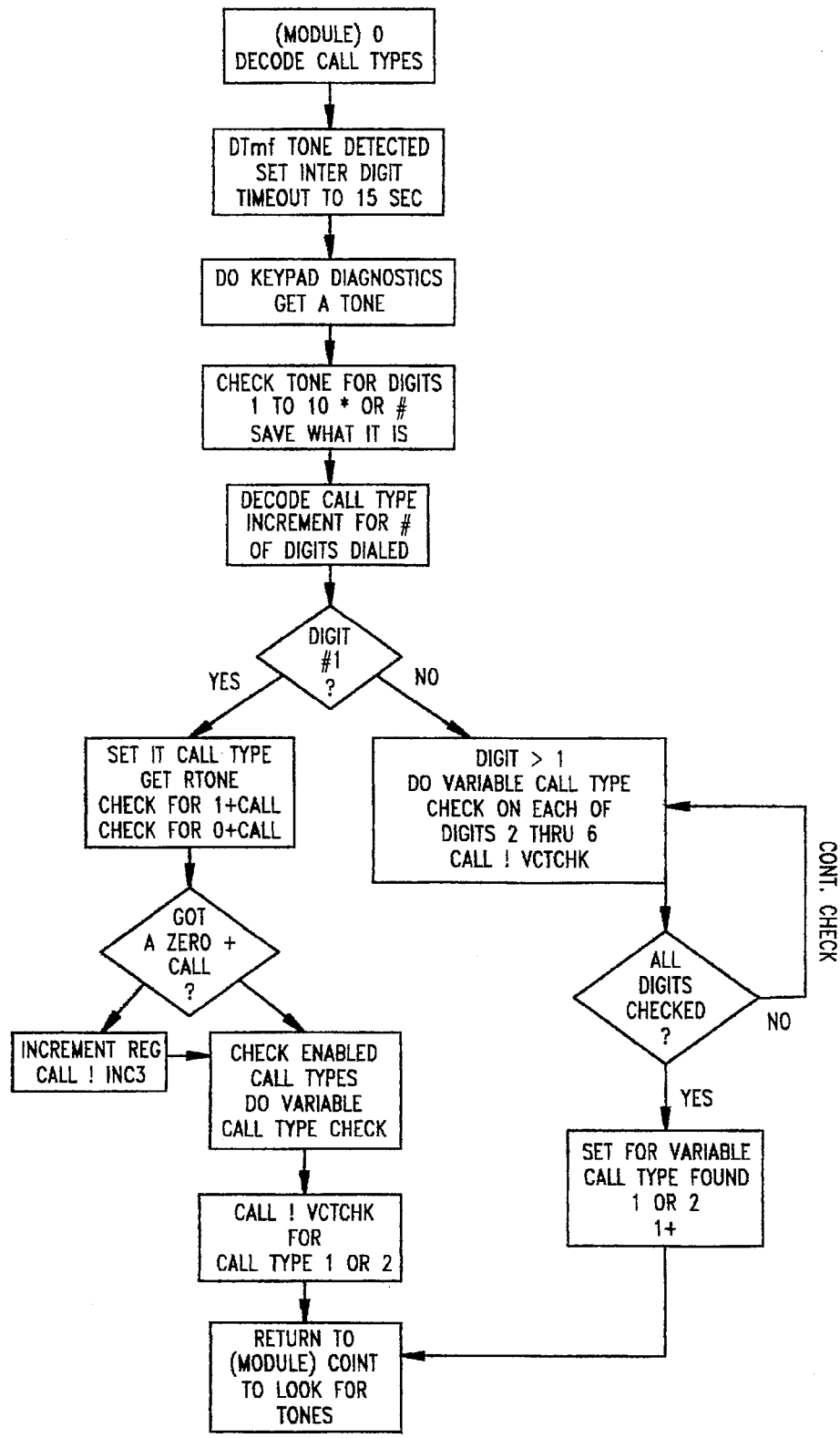
FIG. 40 is a flow diagram showing a decode the call type routine of the remote unit software.

The DCALLT routine shown in FIG. 40 decodes the call types by inspecting the keypad digits pressed at the remote phone and comparing them to the possible call types. When a key pad digit is pressed, it causes a corresponding dtmf tone to be created. DCALLT looks at variable RTONE (representing the dtmf tone) and checks whether it is a digit from 0 to 9 or * or # symbol (see Table I). It stores the tone data that matches one of the digits or symbols in the phone diagnostics word (PHDAG1, 2, 3, 4). Next it decodes the dtmf tones represented by the digits or symbols by determining whether the first digit is a 1+ or 0+, or one of the variable type of user calls. If it is a variable call type, it checks the second to the seventh digit for a match with a variable call type VCT1 or VCT2 by calling the VCTCHK routine. When DCALLT is finished, it returns to the COINT subroutine in the OFFHKR routine to listen for coin tones.

Figure 41:
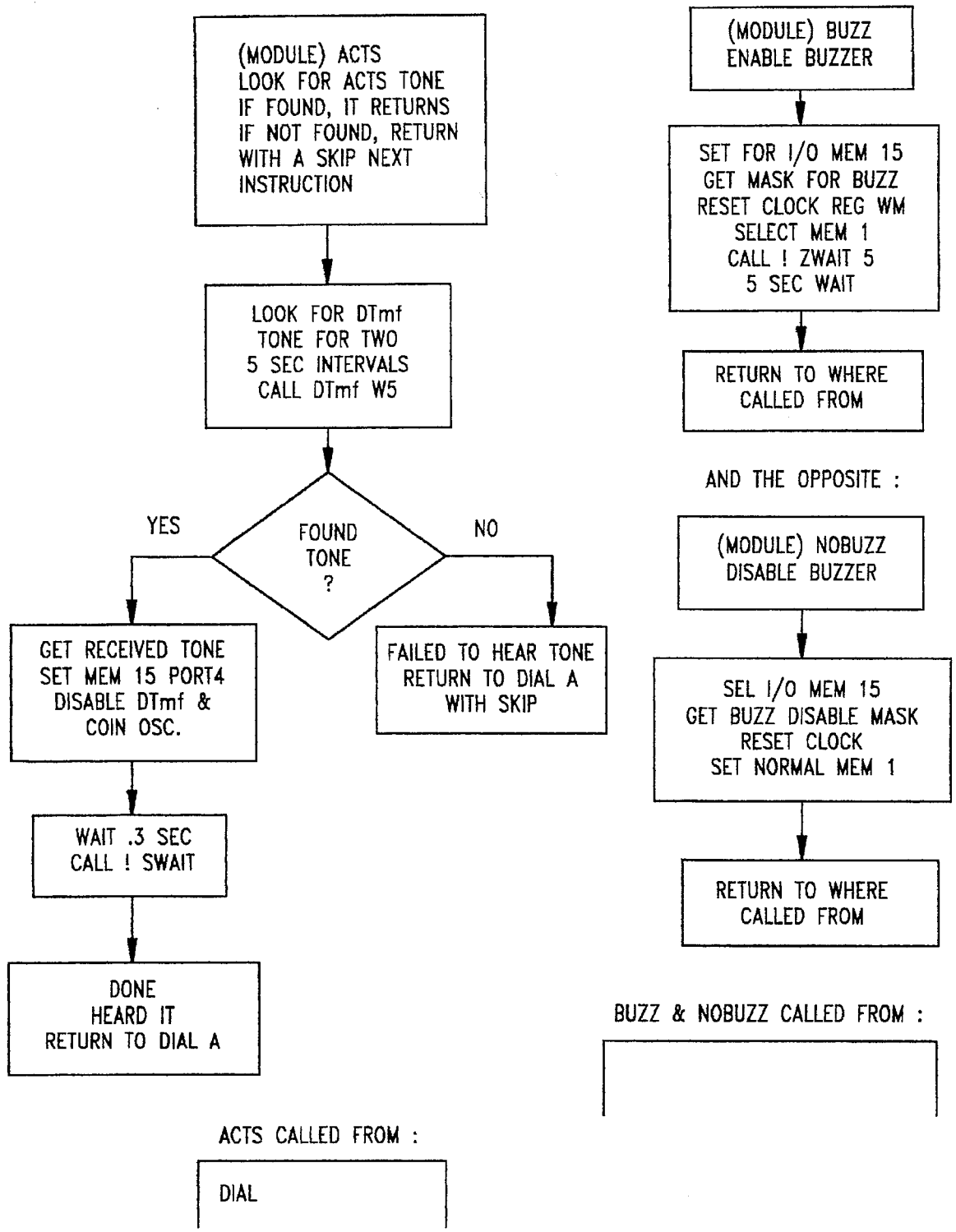
FIG. 41 is a flow diagram of a credit card call routine of the remote unit software.

In FIG. 41, the ACTS routine looks at the dtmf tone in RTONE and compares it with the credit card call type (represented by # pressed on keypad). If found, it disables the dtmf receiver 76 and the coin oscillator and returns to where it was called from in DIAL. However, if the tone does not match a credit card type call, it returns to DIAL where it skips the next instruction.

Figure 42:
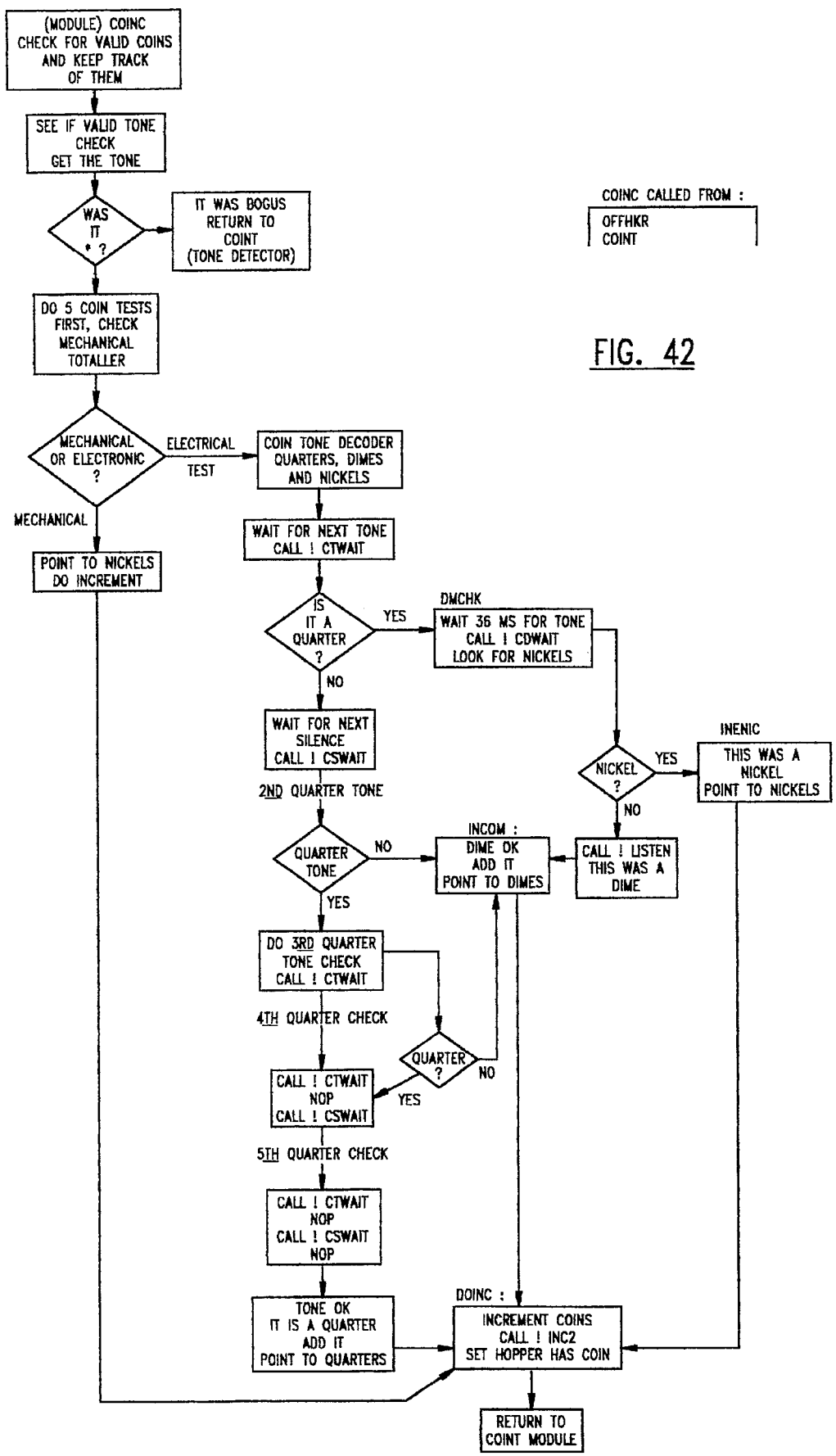
FIG. 42 is a flow diagram showing a coin validation and record keeping routine of the remote unit software.

The COINC routine in FIG. 42 checks for valid coins and keeps track of them. It looks at RTONE and compares it with the valid coin tone code. If valid, it performs either a coin tone decoding routine looking for quarters, dimes and nickels by calling CTWAIT and CSWAIT waiting for the next tones and silences. Otherwise, it increments the value of the coins in nickel units. In either case, COINC calls INC2 to count the coins in nickel equivalents. INC2 increments the contents of the variables QUARTO, DIMESO, and NIKO representing the amount of coins in the hopper in quarters, dimes and nickels respectively. Finally, COINC sets the HOPP flag to signal the OFFHKR routine that the hopper has coins in it, and returns to the COINT coin tone subroutine in OFFHKR.

8. Host Software Interface

In order to enable the host 12 to keep an accounting of the remote's 11 activity and to interface with it, the host employs a communications software program (WESCOMM™) and a database management program (WESROC).

Figure 6:
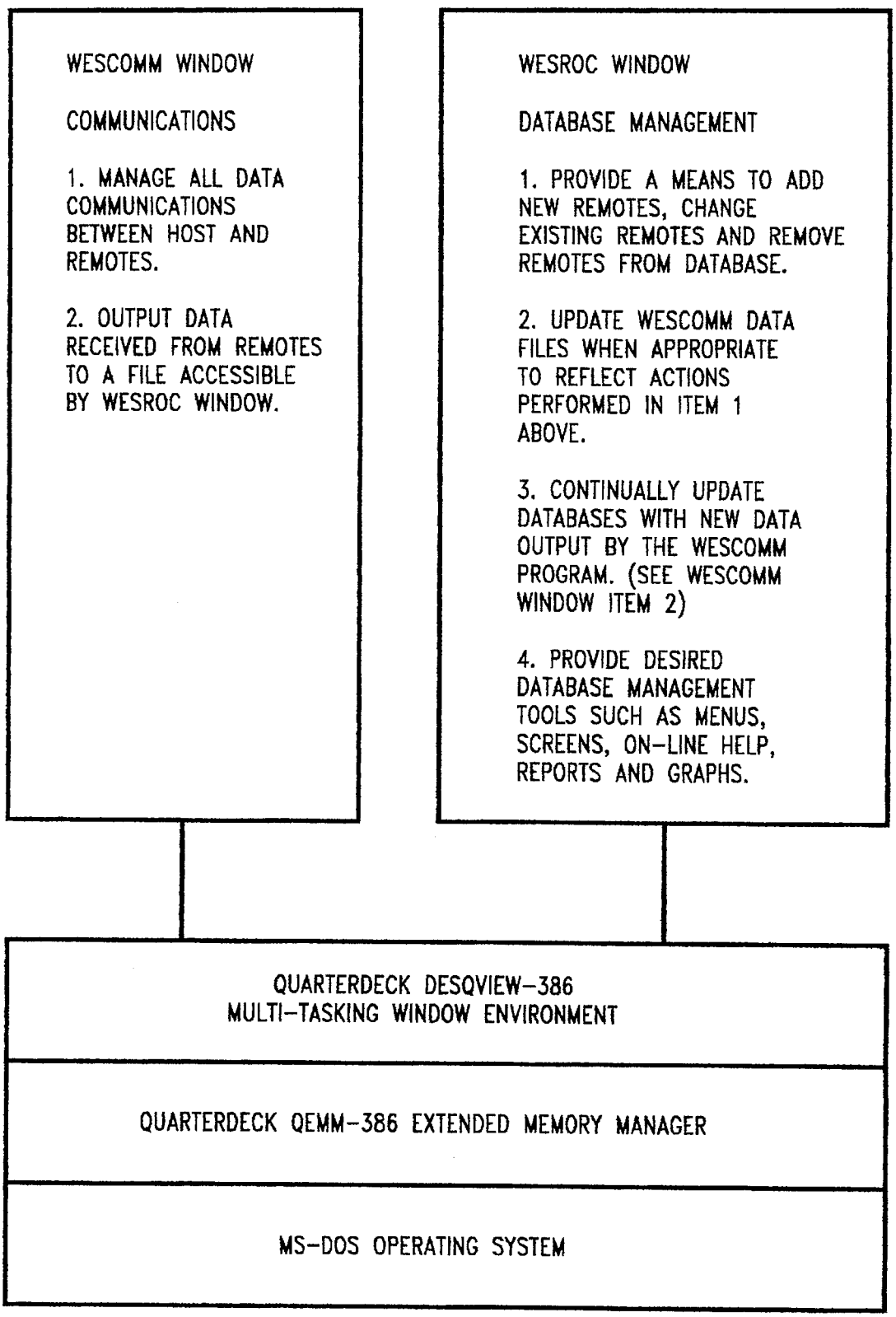
FIG. 6 is a block diagram showing the basic host software structure of this invention.
Figure 7:
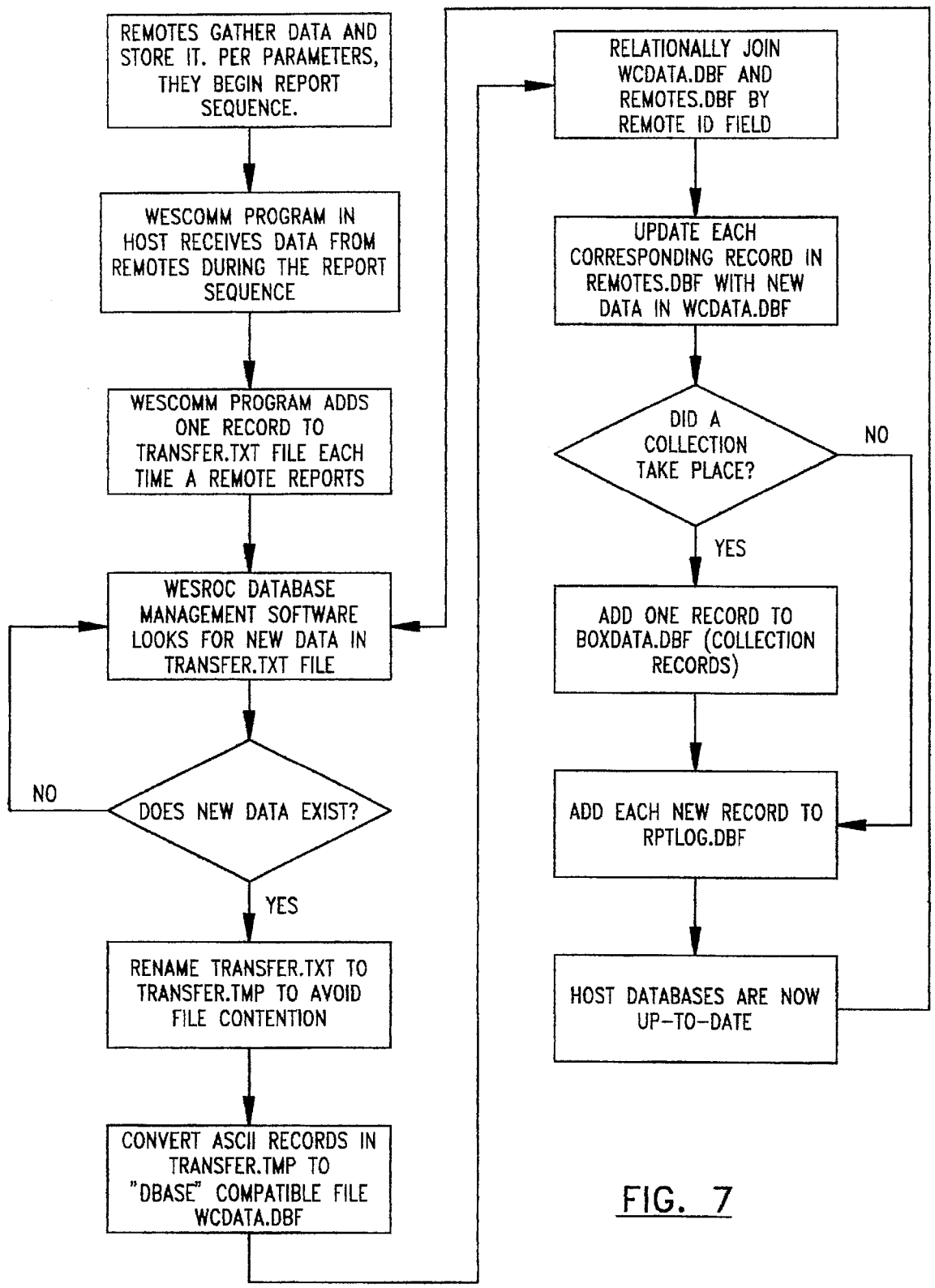
FIG. 7 is a data flow diagram showing the basic flow of data from the remote unit to database software in the host unit.
Figure 8:
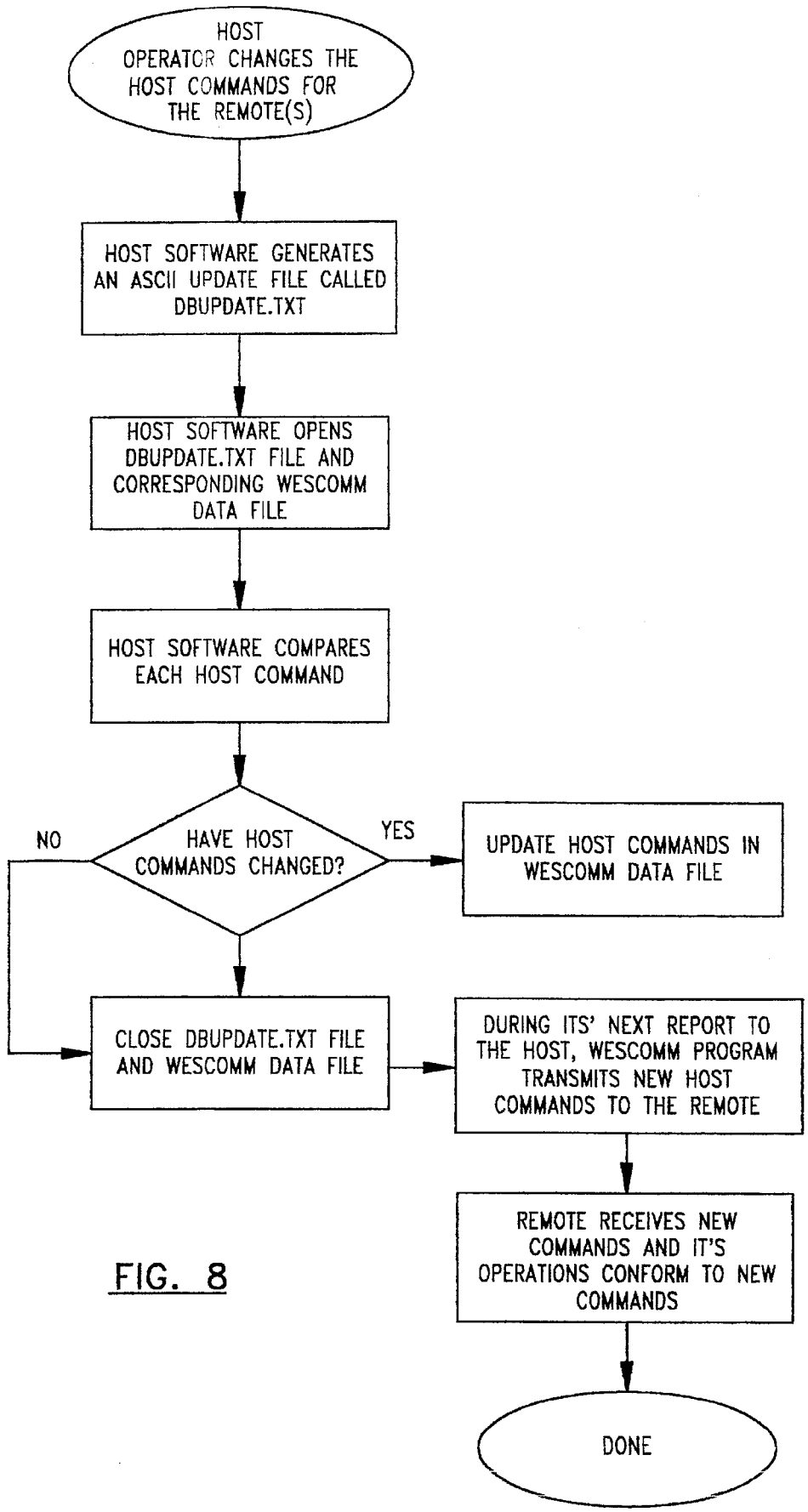
FIG. 8 is a data flow diagram showing the basic flow of host command parameters from the main database to the remote unit.

Referring to FIGS. 6, 7 and 8, the WESCOMM program located in the host computer 12 communicates information between the host interface board and the remote computer board. It sends and receives commands and data, acknowledges and checksums. It monitors the host interface board continuously and processes appropriate routines when a ring-in is detected. These include routines to verify a valid ring-in, put the telephone line "off-hook" and "on-hook", send acknowledgments, receive data and checksums, calculate and verify checksums, send host commands and checksums and read and write WESCOMM data files. The present embodiment of the WESCOMM program is written in BASIC PDS 7.1 language.

The WESROC database management program stores and retrieves data in a dBASE compatible file format. It allows the operator to add new remotes, to specify the Host Commands sent to the remote and to remove remotes no longer in service. Any of these changes to the database result in automatic updating of the corresponding WESCOMM data files. The next time the remote reports to the host the new host commands are sent to the remote. The WESROC program also continually checks for new data from the remotes and, if present, updates the database files to reflect all new data. This program enables the operator to use menus, screens, reports and graphs to monitor remotes and take appropriate action when notified. This program has the ability to maintain historical information on remote activity over a period of hours, days, months or years.

As many changes are possible to the embodiments of this invention utilizing the teachings thereof, the descriptions above, and the accompanying drawings should be interpreted in the illustrative and not the limited sense.

That which is claimed:

1. A method of communicating external source data from one or more remote programmable auditing and monitoring devices for a coin telephone system to a central computer via a telecommunications link, comprising the steps, performed cyclically and continuously of:

(a) determining whether an off-hook data event has occurred, if so then:
   (i) receiving external source input data signals at the remote programmable device;
   (ii) decoding said input data signals into digital data;
   (iii) processing said digital data;
   (iv) storing said digital data; and if not then;
(b) determining whether a reporting event has occurred, if so then:
   (i) retrieving said digital data
   (ii) coding said digital data into corresponding output data signals;
   (iii) transmitting said output data signals to the central computer via the telecommunications link; and if not then:
(c) disrupting steps (a) and (b) for a predetermined time period, whereby power consumption by the remote programmable device is temporarily disrupted, by:

(i) counting time intervals;
(ii) halting steps (a) and (b);
(iii) storing previously received input data;
(iv) waiting until a number of time intervals equals said predetermined time period;
(v) retrieving said stored input data; and
(vi) returning to step (a).

2. The communications method of claim 1, wherein said processing, storing and retrieving steps are accomplished by the additional steps of reading and writing said digital data from volatile memory means to non-volatile memory means, and from said non-volatile memory means to said volatile memory means.

3. The communication method of claim 1, wherein said decoding and coding steps comprise the step of assigning a one to one correspondence between each said input and output data signal and said digital data.

4. The communication method of claim 3, wherein each said input and output data signal consists of one and only one predetermined pair of tone multifrequencies.

5. The communication method of claim 1, wherein there are a finite set of said input and output data signals, and wherein said receiving and transmitting steps are accomplished by the exchange of a predetermined sequence of said data signals, whereby the remote programmable device and the central computer correctly identify each said data signal.

6. The communication method of claim 1, wherein steps (a) through (g) are interrupted indeterminantly by an external event, and wherein said input and output data signals, and said digital data is saved upon said interruption event, whereby the method continues utilizing said saved input and output data signals, and said saved digital data upon termination of said interruption event.

7. The communication method of claim 6, wherein said external event is a telephone call function being performed at the coin telephone system.

8. The communication method of claim 1, wherein said external source input data signals are a function of single and dual tone frequencies generated by coins registered by the coin telephone system.

9. The communication method of claim 1, wherein said external source input data signals are a function of dual tone frequencies generated by key pad activation on the coin telephone system.

10. The communication method of claim 1, wherein said external source input data signals are command and acknowledgment signals received from the central computer.

11. The communication method of claim 1, further comprising the step of decrementing or incrementing a variable number by one until said variable number equals said predetermined number of time intervals.

12. The communication method of claim 1, wherein said transmitting step comprises the steps of:
(a) establishing a telecommunications link between the programmable device and the central computer;
(b) transmitting a first acknowledgment signal from the central computer to the programmable device;
(c) transmitting said output data signals from the programmable device to the central computer in at least one packet;
(d) verifying that the data signals are correct at the central computer, and if so, transmitting a second acknowledgment signal from the central computer to the programmable device;
(e) transmitting an external source data signal from the central computer to the programmable device in at least one packet;
(f) verifying that said external source data signal is correct at the programmable device, and if so, transmitting a third acknowledgment signal from the programmable device to the central computer;
(g) transmitting a fourth acknowledgment signal from the central computer to the programmable device; and
(h) terminating said telecommunications link between the central computer and the programmable device.

* * * * *